(12) United States Patent
Ishida

(10) Patent No.: US 10,913,076 B2
(45) Date of Patent: Feb. 9, 2021

(54) OIL SEPARATOR

(71) Applicant: TOKYO ROKI CO., LTD., Yokohama (JP)

(72) Inventor: Kosaku Ishida, Yokohama (JP)

(73) Assignee: TOKYO ROKI CO., LTD., Yokohama (JP)

(*) Notice: Subject to any disclaimer, the term of this patent is extended or adjusted under 35 U.S.C. 154(b) by 714 days.

(21) Appl. No.: 15/552,408

(22) PCT Filed: Mar. 2, 2015

(86) PCT No.: PCT/JP2015/056065
§ 371 (c)(1),
(2) Date: Aug. 21, 2017

(87) PCT Pub. No.: WO2016/139715
PCT Pub. Date: Sep. 9, 2016

(65) Prior Publication Data
US 2018/0029045 A1    Feb. 1, 2018

(51) Int. Cl.
*B04B 5/12* (2006.01)
*B04B 5/08* (2006.01)
(Continued)

(52) U.S. Cl.
CPC .............. *B04B 5/12* (2013.01); *B01D 45/12* (2013.01); *B01D 45/14* (2013.01); *B04B 5/08* (2013.01);
(Continued)

(58) Field of Classification Search
CPC .. B04B 5/12; B04B 11/02; B04B 7/02; B04B 5/08; B04B 2005/125; B01D 45/12; B01D 45/14; F01M 13/04; F01M 2013/0422
(Continued)

(56) References Cited

U.S. PATENT DOCUMENTS 5,954,035 A    9/1999  Hofer et al.
7,077,881 B2   7/2006  Franzen et al.

FOREIGN PATENT DOCUMENTS

JP    2005-515065 A    5/2005

OTHER PUBLICATIONS

Japanese Office Action in parallel application JP 2017-503222, JPO, dated Mar. 12, 2018, with English translation thereof.
(Continued)

*Primary Examiner* — Walter D. Griffin
*Assistant Examiner* — Shuyi S. Liu
(74) *Attorney, Agent, or Firm* — Harness, Dickey & Pierce, P.L.C.

(57) ABSTRACT

An oil separator separating mist oil from processing-target gas includes: a case, a first partition wall and a lower, second partition wall, both partitioning vertically an internal space of the case; a partition dividing a space between the first and second partition walls into an introduction path and a first chamber; a supply hole vertically penetrating the second partition wall from the introduction path to a separation chamber; a communication hole vertically penetrating the second partition wall from the first chamber to the separation chamber; a rotor in the separation chamber; a center-side space in a center part of the rotor, the center-side space communicating with the supply hole through an open, upper part of the center-side space. The rotor separates the mist oil from the processing-target gas flowing from the center-side space to an outer periphery of the rotor, where the separated oil is emitted. The processing-target gas flows into the first chamber through the communication hole.

11 Claims, 18 Drawing Sheets

(51) Int. Cl.
    *B04B 7/02*     (2006.01)
    *F01M 13/04*    (2006.01)
    *B01D 45/12*    (2006.01)
    *B01D 45/14*    (2006.01)
    *B04B 11/02*    (2006.01)

(52) U.S. Cl.
    CPC ............... *B04B 7/02* (2013.01); *B04B 11/02* (2013.01); *F01M 13/04* (2013.01); *B04B 2005/125* (2013.01); *F01M 2013/0422* (2013.01)

(58) Field of Classification Search
    USPC .................. 123/572, 573, 574; 55/385.1
    See application file for complete search history.

(56) References Cited

OTHER PUBLICATIONS

International Search Report and Written Opinion of the ISA for PCT/JP2015/056065, ISA/JP, Tokyo, dated Jun. 2, 2015.
Form PCT/IB/338 with the English Translation of the International Preliminary Report on Patentability, IB/Geneva, dated Sep. 5, 2017, incorporating the English Translation of the Written Opinion of the ISA, ISA/JP, dated Jun. 2, 2015.
Extended European Search Report in related application EP15883885. 4, ISA/EP, Munich, dated Oct. 24, 2018.

OIL SEPARATOR

CROSS-REFERENCE TO RELATED APPLICATIONS

This application is a 371 U.S. National Stage of International Application No. PCT/JP2015/056065, filed Mar. 2, 2015. The entire disclosure of the above application is incorporated herein by reference.

TECHNICAL FIELD

The present invention relates to an oil separator that separates mist oil contained in processing-target gas from the gas.

BACKGROUND ART

There is known an oil separator which separates from processing-target gas mist oil contained in the processing-target gas (see Patent Literature 1, for example). The following will describe an oil separator described in Patent Literature 1 using reference signs of Patent Literature 1 with blankets. A cylindrical upper housing (2) is disposed above a cylindrical lower casing (1). The hollow of the upper housing (2) is closed from above by an end wall (3), and the hollow of the upper housing (2) is closed from below by a partition (5). Inside the upper housing (2), a gas cleaning device (13) for cleaning gas is disposed, and inside the lower casing (1), a centrifugal rotor (11) for cleaning liquid is disposed.

The gas cleaning device (13) is a centrifugal oil separator, and the rotor of the gas cleaning device (13) is composed of a plurality of stacked separation disks (37). Every separation disk (37) is interposed between a plate-like upper holder (36) and a lower holder (35); thus, the separation disks are held by these holders (35, 36). The separation disks (37), the upper holder (36) and the lower holder (35) rotate together with the centrifugal rotor (11) using hydraulic pressure of the centrifugal rotor (11). There is an opening formed at the center of each separation disk (37). The openings of the separation disks (37) are stacked vertically, forming an inlet chamber (39) at the center of the stack of the separation disks (37). The lower holder (35) has holes (38) formed above the opening (8) of the partition (5).

Blow-by gas (processing-target gas) from a crankcase is flowing from the lower casing (1) through the opening (8) of the partition (5) and the holes (38) of the lower holder (35) into the inlet chamber (39). While the blow-by gas is flowing radially outward in clearances between the separation disks (37), mist oil contained in blow-by gas is captured by the clearances between the separation disks (37). Blow-by gas blown out from the outer edge of the separation disks (37) moves upward in the upper housing (2) and is discharged. Oil captured by the clearances between the separation disks (37) is blown toward the inner peripheral surface of the upper housing (2) due to the centrifugal force of the separation disks (37). Oil attached to the inner peripheral surface flows down along the inner peripheral surface.

CITATION LIST

Patent Literature

Patent Literature 1: Japanese Unexamined Patent Application Publication No. 2005-515065

DISCLOSURE OF THE INVENTION

Problems to be Solved by the Invention

With a technique described in Patent Literature 1, accompanying with the rotation of the rotor composed of the separation disks, blow-by gas is turning and rising in the upper housing. Accordingly, oil attached to the inner surface of the upper housing is pushed upward by turning flow of blow-by gas. Thus, there is a possibility that the separated oil is discharged together with blow-by gas from the oil separator; therefore, the oil removal efficiency of the oil separator deteriorates.

Depending on the arrangement of pipes connected to the oil separator, in some cases, it is desirable that blow-by gas from a crankcase is supplied from above the rotor to the central inlet chamber. However, in a technique described in Patent Literature 1, since blow-by gas from which oil has been removed is discharged above the rotor, significant change of the configuration is required in order to conduct both of intake and discharge of blow-by gas above the rotor.

The present invention has been made in consideration of such circumstances. An object of the present invention is to prevent liquid separated by a rotor from processing-target gas from being discharged together with the processing-target gas. In addition, the object is to enable to intake and discharge processing-target gas above the rotor.

SUMMARY OF INVENTION

The present invention to achieve the above-described object is an oil separator that separates mist oil from processing-target gas containing the mist oil, including: a tubular case having an internal space and an inlet hole which is communicated with the internal space; a first partition wall partitioning the internal space into a space with which the inlet hole is communicated and a space located above the space; a second partition wall disposed in the internal space lower than the first partition wall, the second partition wall vertically partitioning a space of the internal space located lower than the first partition wall; a partition portion disposed between the first partition wall and the second partition wall, the partition portion dividing a space between the first partition wall and the second partition wall into an introduction path and a first chamber, the introduction path being communicated with the inlet hole, the first chamber being separated away from the inlet hole; a supply hole disposed inside the introduction path and communicated with above and below the second partition wall; a communication hole disposed inside the first chamber and vertically penetrating through the second partition wall; a rotor being housed in the internal space at a lower position than the second partition wall, the rotor rotating around a vertically-extending rotation axis; and a center-side space disposed in a center part of the rotor, the center-side space being communicated with the supply hole through an upper part of the center-side space which is open, wherein the processing-target gas is introduced from the inlet hole to the introduction path, the processing-target gas flows into the center-side space through the supply hole, the rotor rotates to separate the mist oil from the processing-target gas which is flowing from the center-side space to an outer periphery of the rotor, the separated oil is emitted from the outer periphery of the rotor, the processing-target gas which has discharged from the outer periphery of the rotor flows into the first chamber through the communication hole.

When the processing-target gas discharged from the outer periphery of the rotor flows into the first chamber through the communication hole, the flow speed of the processing-target gas decreases inside the first chamber. Accordingly, even if oil attached to the inner peripheral surface of the case is pushed upward by the updraft of the processing-target gas so that the oil flows into the first chamber through the communication hole, the oil remains in the first chamber. Thus, the processing-target gas which flows downstream from the first chamber to be discharged hardly contains oil. Accordingly, the separation efficiency of the oil separator is high.

Further, the space between the first partition wall and the second partition wall is divided by the partition portion into the introduction path and the first chamber. And, the introduction path is communicated with the center-side space of the rotor via the supply hole of the second partition wall, and the first chamber is communicated with a space below the second partition wall via the communication hole of the second partition wall. Therefore, the processing-target gas supplied to the rotor flows from up to down, the processing-target gas discharged from the rotor flows from below to above. Accordingly, intake and discharge of the processing-target gas is conducted above the rotor.

In the above-described oil separator, the communication hole is arranged inside with respect to the outer periphery of the rotor.

Accordingly, even if oil attached to the inner peripheral surface of the case is pushed upward by the updraft of the processing-target gas, the oil is less likely to enter into the communication hole. Thus, the processing-target gas which flows downstream from the first chamber to be discharged hardly contains oil, and the separation efficiency of the oil separator is high.

In the above-described oil separator, the oil separator further comprises a fitted portion disposed projecting downward from a lower surface of the second partition wall and inserted into an upper opening of the center-side space, and the supply hole extends from an upper surface of the second partition wall to a lower end portion of the fitted portion. This makes it possible to suppress the processing-target gas from leaking to the vicinity of the rotor at a part where the rotor and the second partition wall are coupled.

In the above-described oil separator, the oil separator further comprises: a lower partition wall member disposed in a lower end of the case and being adjacent to a separation chamber located below the second partition wall; a lower case covering the lower partition wall member from below and constituting an injection chamber below the lower partition wall member; a through hole formed on the lower partition wall member to vertically penetrate through the lower partition wall member; a spindle being passed through the through hole and rotating with the rotor as a single integrated unit; and a nozzle disposed projecting from an outer peripheral surface of the spindle in the injection chamber, the nozzle injecting oil in a circumferential direction, the nozzle rotating the spindle and the rotor, the rotor includes: a plurality of separation disks being stacked and vertically spaced in the separation chamber; and a lower holder holding the plurality of separation disks from below, the center-side space vertically penetrate through the plurality of separation disks and the lower holder, the spindle is inserted into the center-side space, the outer peripheral surface of the spindle is bonded to an inner peripheral edge of the lower holder, and the spindle closes an lower opening of the center-side space.

This makes it possible to prevent the processing-target gas in the center-side space from leaking downward from inside the inner peripheral edge of the lower holder.

In the above-described oil separator, the oil separator further comprises a labyrinth seal disposed around the through hole and between the lower partition wall member and the lower holder.

Accordingly, the processing-target gas discharged from the outer periphery of the rotor into the separation chamber can be prevented from leaking to the injection chamber located below the lower partition wall member through between the lower partition wall member and the lower holder.

In the above-described oil separator, the oil separator further comprises: a communication tube portion disposed of the lower case, the communication tube portion being communicated from the injection chamber with a crankcase of an engine; and a pressure control hole penetrating inside the through hole through the lower holder and communicated with the center-side space, and the processing-target gas in the crankcase flows into the center-side space through the communication tube portion through the injection chamber through the pressure control hole.

Accordingly, the rotor can separate mist oil not only from processing-target gas flowing into the center-side space from the inlet hole through the introduction path and the supply hole, but also from processing-target gas flowing into the center-side space from the crankcase of the engine through the communication tube portion through the injection chamber through the pressure control hole.

In the above-described oil separator, the oil separator further comprises: a drain hole vertically penetrating through the lower partition wall member; a standing wall disposed upright on a top surface of the lower partition wall member at an inner edge of the drain hole; and a ceiling disposed above the drain hole and extending radially outward at an upper portion of the standing wall, the ceiling is inclined downward from one circumferential end of the drain hole to another circumferential end, and a lowest portion of the ceiling is coupled to the other circumferential end of the drain hole.

Preferably, an outer circumferential end portion of the ceiling abuts on an inner peripheral surface of the case.

Accordingly, oil above the lower partition wall member is pushed by wind generated by the rotation of rotor into an opening surrounded by the ceiling and the standing wall. The oil is more likely to discharge through the drain hole to a chamber below the lower partition wall member.

In the above-described oil separator, the oil separator further comprises: a drain hole vertically penetrating through the lower partition wall member; a tubular partition wall projecting upward on an outer peripheral edge of the lower holder; and a flange extending radially outward from the partition wall, the flange is located away from an inner peripheral surface of the case, a clearance is formed between the flange and the inner peripheral surface of the case, an oil process chamber is formed between the flange and the lower partition wall member, the oil process chamber and the separation chamber are communicated through the clearance between the flange and the inner peripheral surface of the case, the drain hole penetrates inside the oil process chamber through the lower partition wall member.

Accordingly, the pressure inside the oil process chamber is lower than the pressure inside the separation chamber. And, a difference between the pressure inside the oil process chamber and the pressure inside the injection chamber is small. Oil on the lower partition wall member continuously flows into the drain hole, thereby a backflow of the oil is less likely to occur.

In the above-described oil separator, the oil separator further comprises a tubular oil guard disposed extending downward from a lower surface of the lower partition wall member, the nozzle is disposed inside the oil guard, and the drain hole is disposed outside the oil guard.

Accordingly, since oil injected from the nozzle is sprayed to the oil guard, the oil does not enter into the drain hole.

In the above-described oil separator, the oil separator further comprises: an upper partition wall member disposed in an upper end of the case and being adjacent to a second chamber located above the first partition wall; a second communication hole vertically penetrating through the first partition wall from the first chamber to the second chamber; an upper case covering the upper partition wall member from above and constituting a third chamber above the upper partition wall member; a valve hole vertically penetrating through the upper partition wall member from the second chamber to the third chamber; a valve opening/closing the valve hole and disposed in the second chamber, the valve adjusting a level of an opening of the valve hole, a gas discharge portion disposed in the upper case, the gas discharge portion discharging the processing-target gas from the third chamber.

Accordingly, the second chamber and the third chamber are disposed in the path from the first chamber to the gas discharge portion, and the flow speed of the processing-target gas decreases inside the second chamber and the third chamber. Thus, even supposing that the oil flows in the second chamber and in the third chamber according to the flow of the processing-target gas, the oil remains in the second chamber or in the third chamber. Accordingly, the separation efficiency of the oil separator is high.

Advantageous Effects of Invention

According to the present invention, oil separated by a rotor from processing-target gas can remain in the first chamber, and it is possible to prevent oil from being discharged together with the processing-target gas. In addition, it is possible to intake and discharge processing-target gas above the rotor.

DETAILED DESCRIPTION

Figure 1:
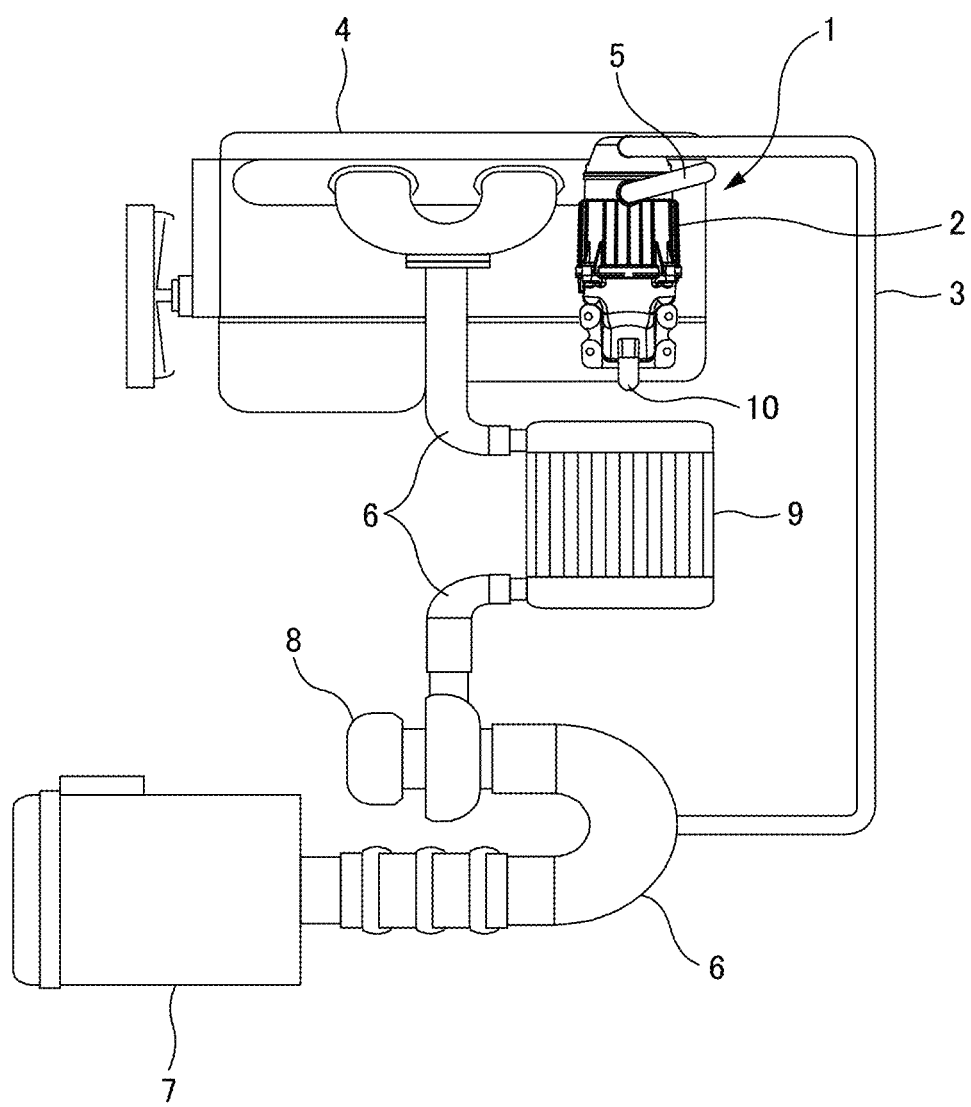
FIG. 1 is a schematic diagram illustrating a closed crankcase ventilation system.
Figure 2:
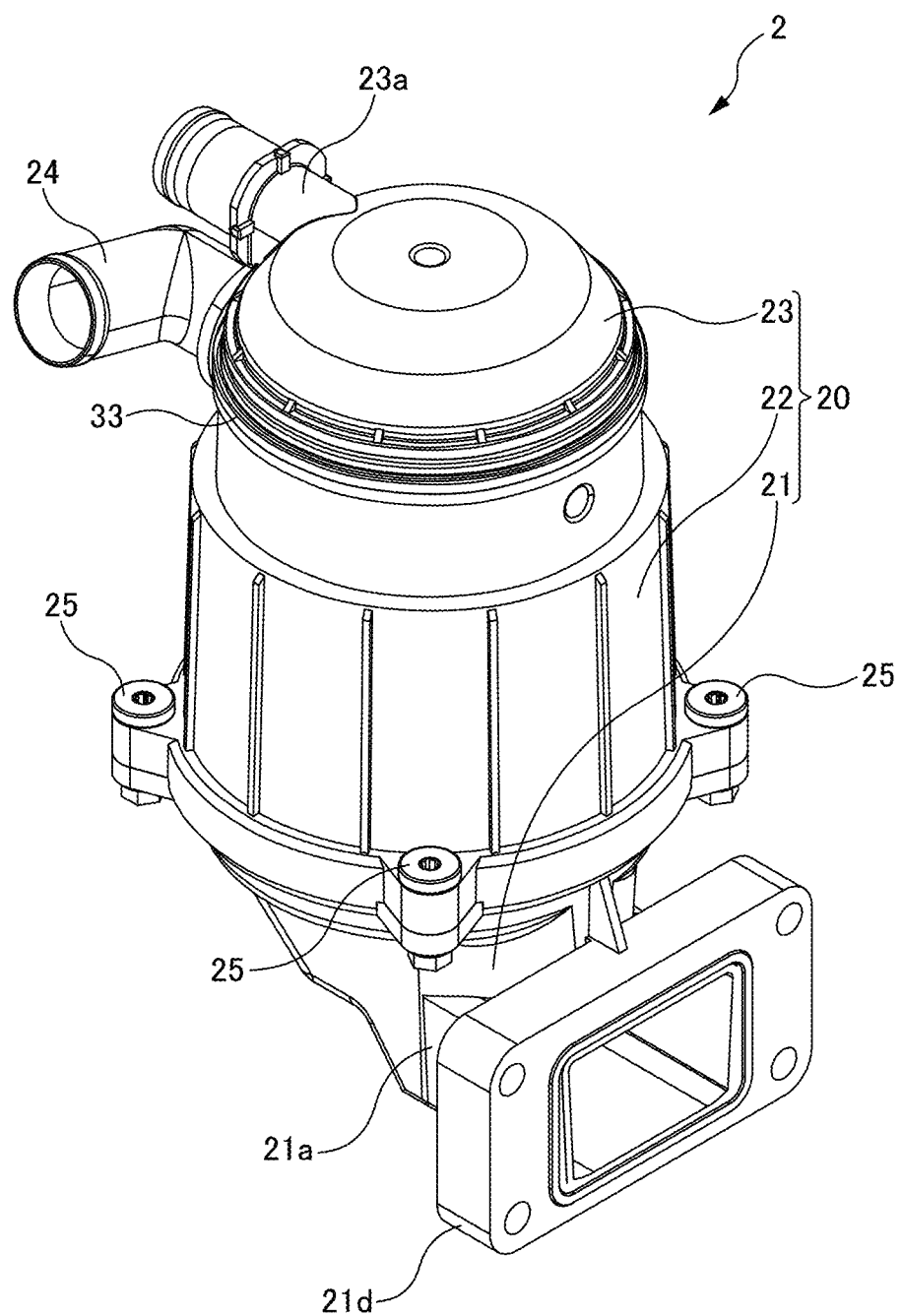
FIG. 2 is a perspective view viewing an oil separator from a right side, an upper side, and a rear side.
Figure 3:
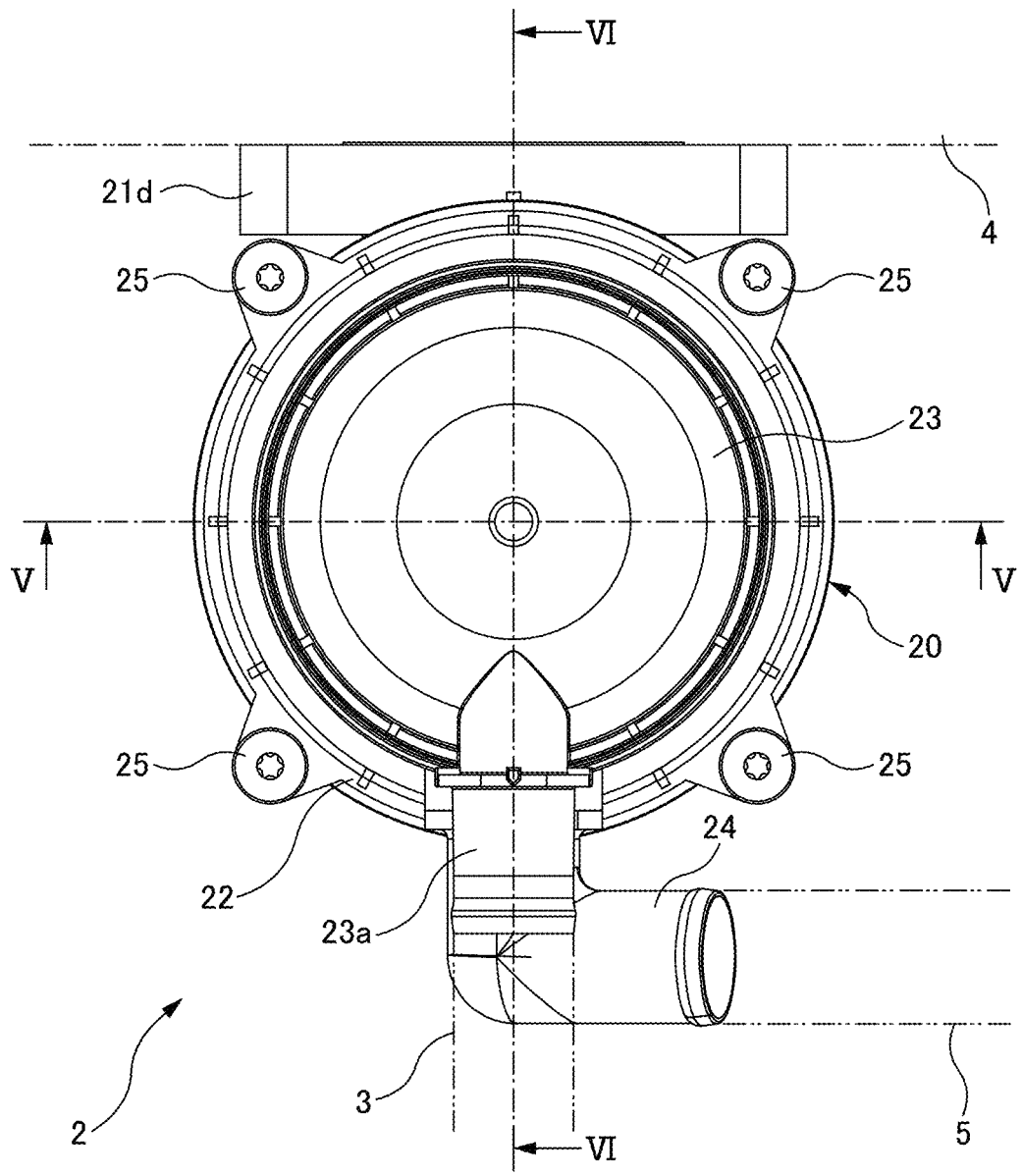
FIG. 3 is a top view of the oil separator.

The following describes embodiments of the present invention with reference to the drawings. The embodiments described later include various limitations technically preferable to embody the present invention; therefore, the scope of the present invention is not limited to the following embodiments and the examples illustrated in the drawings.

A closed crankcase ventilation system 1 (hereinafter referred to as a ventilation system 1) illustrated in FIG. 1 is an example of applying the present invention. As illustrated in FIG. 1, the ventilation system 1 includes an oil separator 2, a breather pipe 3, a gas introduction pipe 5, and an oil supply pipe 10. The oil separator 2 is mounted to a side surface of an engine 4. The gas introduction pipe 5 is coupled to the engine 4 and the oil separator 2. Blow-by gas discharged from the crankcase of the engine 4 passes through the gas introduction pipe 5 and is supplied to the oil separator 2. The blow-by gas supplied from the crankcase of the engine 4 to the oil separator 2 is processing-target gas, and this blow-by gas contains mist oil. The oil separator 2 processes the supplied blow-by gas and separates the mist oil from the blow-by gas.

The breather pipe 3 is coupled between the upper portion of the oil separator 2 and an intake-side flow passage 6 of the engine 4. The already-processed blow-by gas discharged from the oil separator 2 passes through the breather pipe 3 and is restored to the intake-side flow passage 6. Specifically, the already-processed blow-by gas is restored to a part of the intake-side flow passage 6 coupling an air filter 7 and a turbocharger 8. The restored blow-by gas is mixed with fresh air from the air filter 7 and is compressed by the turbocharger 8. Afterwards, the blow-by gas is cooled by a charge cooler 9 and supplied to the engine 4.

The oil supply pipe 10 is coupled between the lower portion of the oil separator 2 and the engine 4. The oil delivered from the engine 4 passes through the oil supply pipe 10 and is supplied to the oil separator 2. A flow of the oil supplied to the oil separator 2 is used as a power for the oil separator 2, and the power operates the oil separator 2 (especially, a rotor unit 50 described later). Since the oil supplied to the oil separator 2 is a part of lubricating oil used by the engine 4, the temperature of the oil is approximately 80 to 110° C. The operation of the oil separator 2 by the oil separates the mist oil from the blow-by gas by the oil separator 2. The separated mist oil is mixed with the oil supplied to the oil separator 2 through the oil supply pipe 10 at the inside of the oil separator 2. The mixed oil is returned to the engine 4.

The following describes the oil separator 2 in detail. As illustrated in FIG. 2 to FIG. 6, this oil separator 2 includes a housing 20, a lower partition wall member 31, a middle partition wall member 32, an upper partition wall member 33, the rotor unit 50, and a PCV valve 90. The housing 20 includes a lower case 21, a middle case 22, and an upper case 23. These lower case 21, middle case 22, and upper case 23 are combined with one another to assemble the housing 20, and an internal space is formed at the inside of the housing 20. The lower partition wall member 31, the middle partition wall member 32, and the upper partition wall member 33 are attached to the housing 20. The lower partition wall member 31, the middle partition wall member 32, and the upper partition wall member 33 partition the internal space of the housing 20. The rotor unit 50, the PCV valve 90, and a similar component are attached to the housing 20 while being internally housed in the internal space of the housing 20.

Unless otherwise stated, the following describes an axial direction as a direction parallel to a rotation axis of the rotor unit 50, a circumferential direction as a circumferential direction around the rotation axis of the rotor unit 50, and a radial direction as a direction perpendicular to the rotation axis of the rotor unit 50. With the oil separator 2 mounted to the engine 4, the rotation axis of the rotor unit 50 extends in the up-down direction (specifically, a vertical direction).

The following describes the housing 20 and the internal space and also describes the partitions of the internal space in the housing 20 by the lower partition wall member 31, the middle partition wall member 32, and the upper partition wall member 33.

As illustrated in FIG. 4 to FIG. 6 and FIG. 9, the middle case 22 is a part that constitutes and separates the central part of the internal space in the housing 20. The middle case 22 has a tubular shape, and the top and the bottom of the middle case 22 are open. A partition wall 22a is disposed in the upper portion of the middle case 22. The partition wall 22a partitions a hollow in the middle case 22 into a space located higher than the partition wall 22a and a space located lower than the partition wall 22a.

An inlet hole 22b is formed on the outer peripheral surface of the middle case 22. The inlet hole 22b is positioned at the upper portion of the middle case 22 and is located lower than the partition wall 22a; therefore, the inlet hole 22b is communicated with the hollow located lower than the partition wall 22a. One end of a suction pipe 24 is coupled to the inlet hole 22b. The other end of the suction pipe 24 is coupled to the gas introduction pipe 5 (see FIG. 1 and FIG. 3). Therefore, the blow-by gas supplied from the engine 4 to the oil separator 2 passes through the suction pipe 24 and the inlet hole 22b and is introduced to the part located lower than the partition wall 22a in the internal space of the housing 20 (specifically, an introduction path 41 described later).

Figure 10:
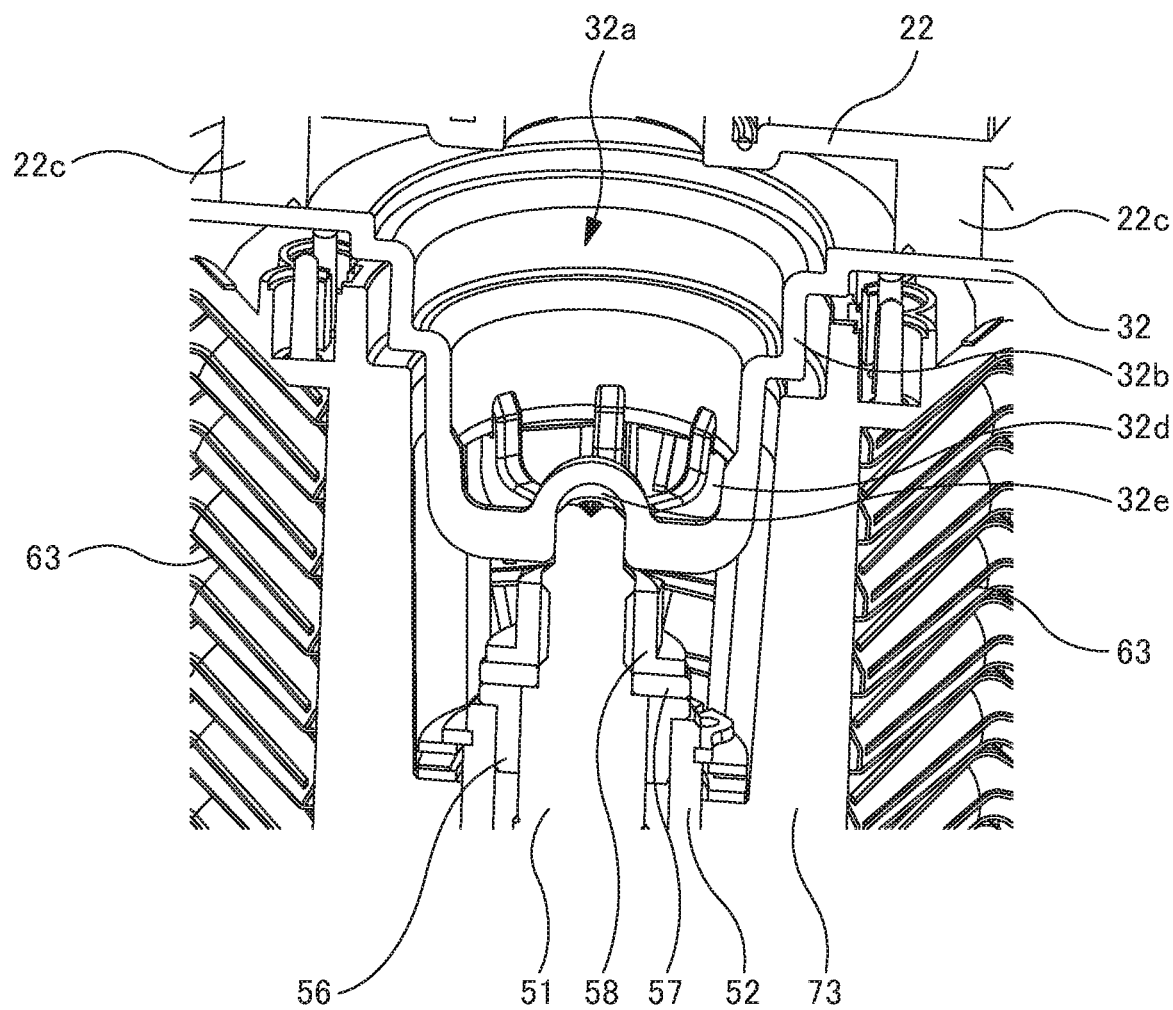
FIG. 10 is an enlarged perspective view illustrating the oil separator cut taken along the V-V cross-sectional surface illustrated in FIG. 3 viewed from a front side, an upper side, and a right side.
Figure 11:
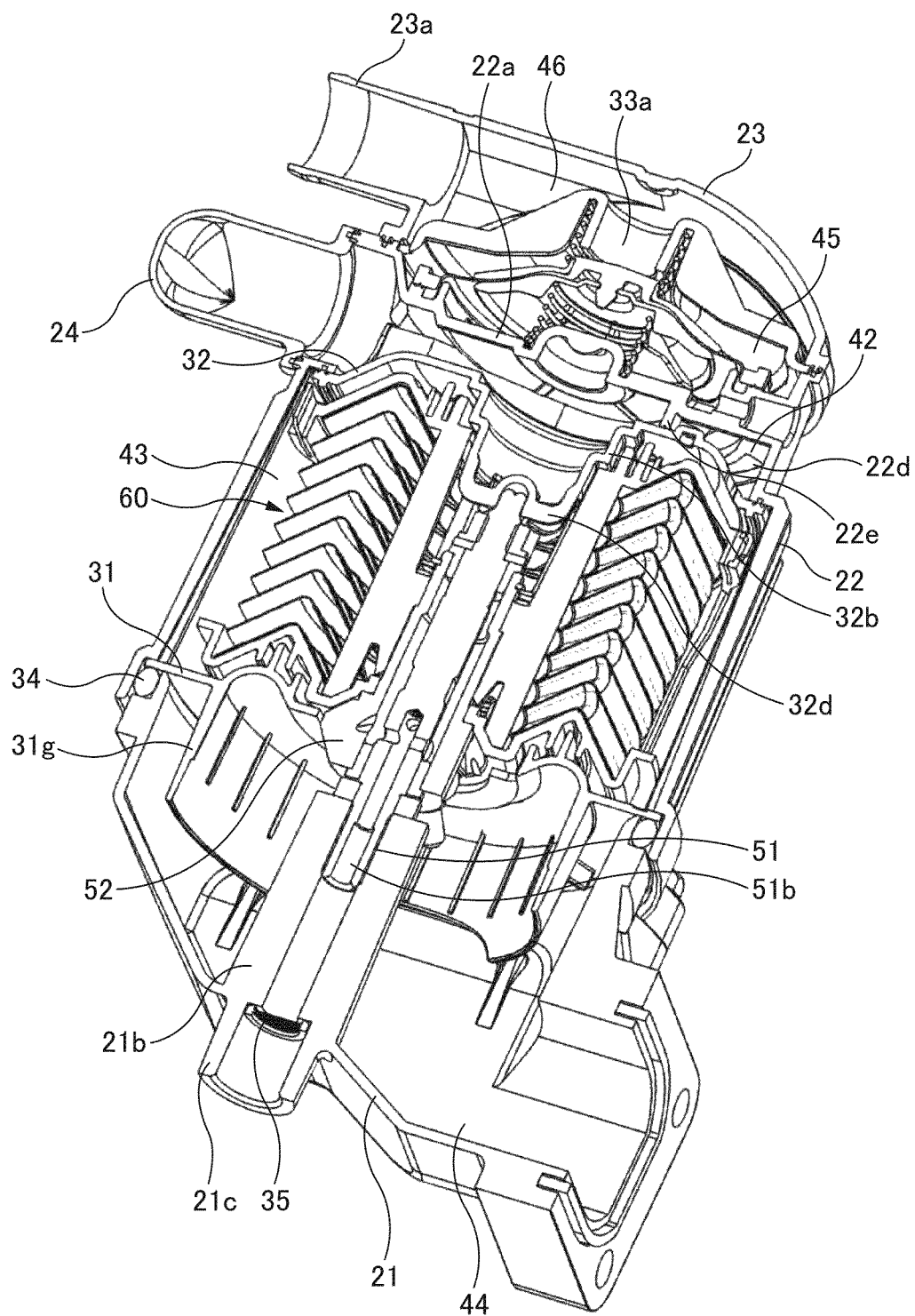
FIG. 11 is a perspective view illustrating the oil separator cut taken along the VI-VI cross-sectional surface illustrated in FIG. 3 viewed from a right side, a lower side, and a rear side.

The middle case 22 houses the middle partition wall member 32 at a position away from and lower than the partition wall 22a. The middle partition wall member 32 has a disk shape. The peripheral edge portion of the middle partition wall member 32 is bonded to the inner peripheral surface of the middle case 22. The middle partition wall member 32 vertically partitions the hollow in the middle case 22 (the hollow located lower than the partition wall 22a). A cylindrical-shaped fitted portion 32b is disposed projecting downward at the center of the lower surface of the middle partition wall member 32. As illustrated in FIG. 10, a hollow in the fitted portion 32b (a supply hole 32a) opens at the top surface of the middle partition wall member 32 and also opens at the lower end of the fitted portion 32b. Supporting portions 32d are disposed at the opening of the lower end of the fitted portion 32b. The supporting portions 32d radially extend from the center of the opening, and are coupled to the inner peripheral surface of the fitted portion 32b. A concave portion 32e is formed on the lower surface at the center of the supporting portions 32d. Since the supporting portions 32d extend radially, the supporting portions 32d do not obstruct the hollow in the fitted portion 32b. The supporting portions 32d support the upper end of a spindle shaft 51 (to be described later).

Figure 12:
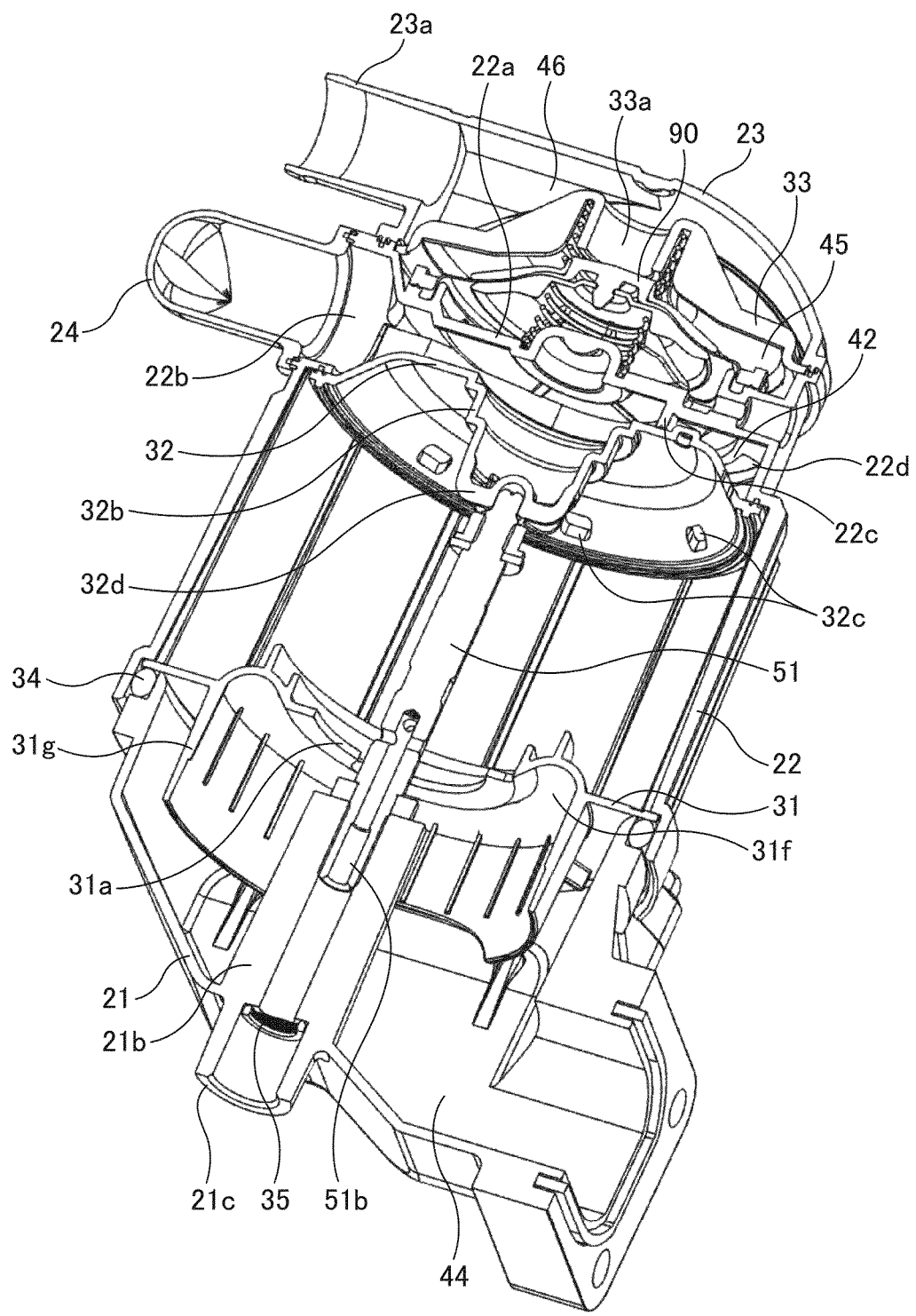
FIG. 12 is a perspective view illustrating the oil separator cut taken along the VI-VI cross-sectional surface illustrated in FIG. 3 viewed from a right side, a lower side, and a rear side.
Figure 13:
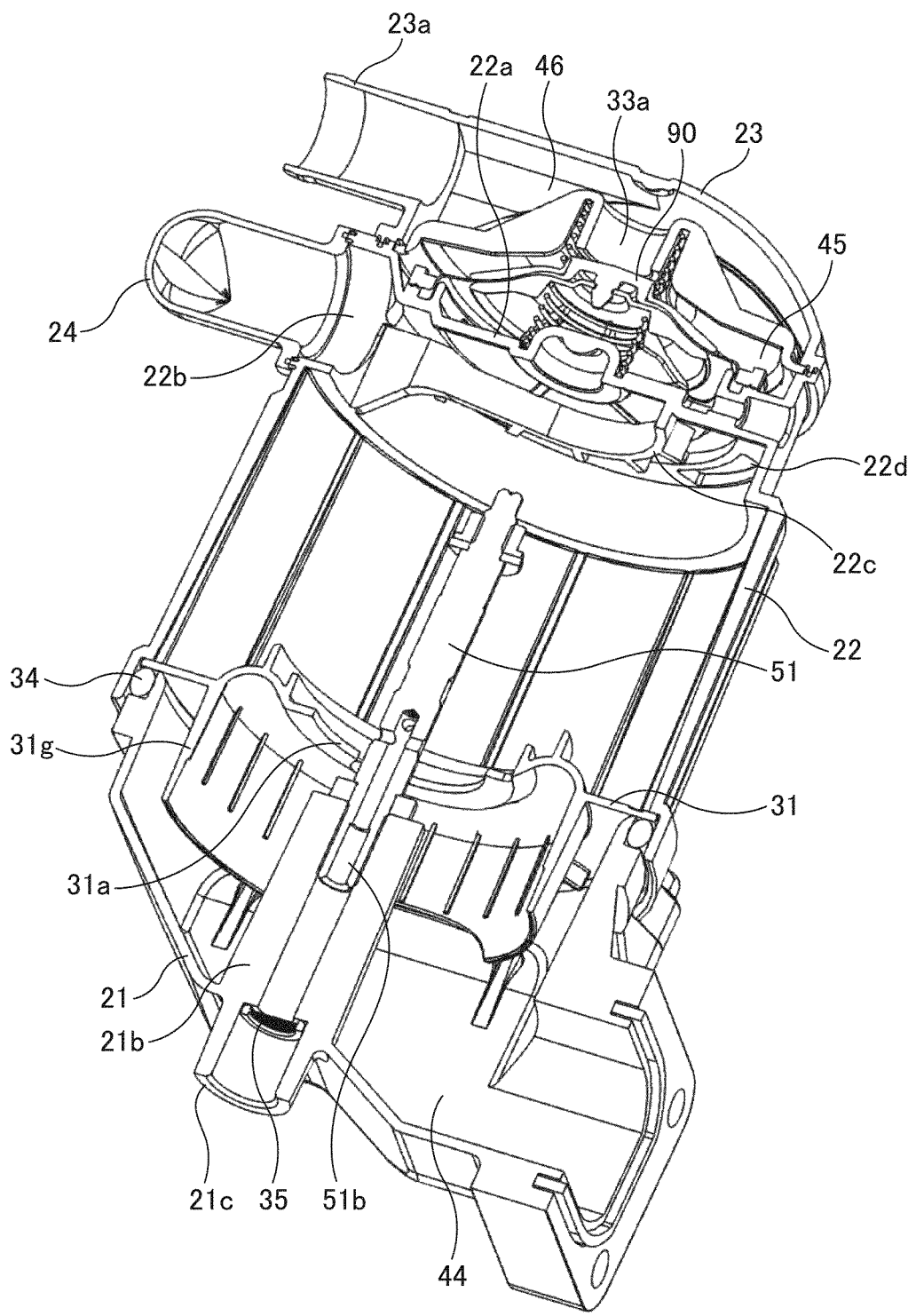
FIG. 13 is a perspective view illustrating the oil separator cut taken along the VI-VI cross-sectional surface illustrated in FIG. 3 viewed from a right side, a lower side, and a rear side.

For easy viewing of the internal structure of the housing 20, FIG. 12 omits an illustration of a rotor 60 of the rotor unit 50. For easy viewing of the internal structure of the housing 20, FIG. 13 omits illustrations of the rotor 60 of the rotor unit 50 and the middle partition wall member 32. As illustrated in FIG. 7 and FIG. 11 to FIG. 13, a rib (a partition portion) 22c is disposed projecting at the lower surface of the partition wall 22a. The top surface of the middle partition wall member 32 firmly contact the rib 22c, and the contact part of the top surface of the middle partition wall member 32 with the rib 22c becomes airtight. This rib 22c is shaped into a U shape viewed from below (FIG. 13 illustrates a half body of the U shape). Both ends of the U-shaped rib 22c are coupled to the inner peripheral surface of the middle case 22, and the inlet hole 22b is disposed between both ends. The rib 22c partitions a space between the middle partition wall member 32 and the partition wall 22a into two spaces: a space 41 (hereinafter referred to as the introduction path 41) on a side closer to both of the inlet hole 22b and the upper opening of the fitted portion 32b; and a space 42 (hereinafter referred to as a first chamber 42) surrounding the introduction path 41. The blow-by gas passing through the inlet hole 22b and introduced into the housing 20 passes through the introduction path 41 and the inside of the fitted portion 32b. And, the blow-by gas is sent below the middle partition wall member 32.

The introduction path 41 is a path for blow-by gas before the blow-by gas is introduced to the rotor unit 50. The first chamber 42 is a path for blow-by gas after the blow-by gas is discharged from the rotor unit 50. The rotor unit 50 is to separate the mist oil from the blow-by gas; therefore, the mist oil is removed from the blow-by gas discharged from the rotor unit 50.

The above-described introduction path 41 and first chamber 42 can be disposed above the rotor unit 50 because the space between the partition wall 22a and the middle partition wall member 32 is divided by the rib 22c. Since the introduction path 41 is above the rotor unit 50, both the introduction path 41 and the inlet hole 22b can be disposed at the upper portion of the housing 20.

The partition wall 22a has a communication hole 22d (especially see FIG. 13) that vertically penetrates the partition wall 22a. The communication hole 22d is positioned outside the rib 22c, and the hollow upper side of the partition wall 22a is communicated with the first chamber 42 through the communication hole 22d. The communication hole 22d is a flow passage for processed blow-by gas from which the mist oil has been removed.

Meanwhile, the partition wall 22a closes the upper part of the introduction path 41, and separates the hollow upper side of the partition wall 22a and the introduction path 41.

A plurality of communication holes 32c are formed on the peripheral edge portion of the middle partition wall member 32 so as to vertically penetrate the middle partition wall member 32. These communication holes 32c are arranged at regular intervals along the circumferential direction. The communication holes 32c are positioned outside the rib 22c. The hollow on the lower side of the middle partition wall member 32 is communicated with the first chamber 42 by the communication holes 22d. The communication holes 22d are flow passages for processed blow-by gas from which the mist oil has been removed.

The upper partition wall member 33 is mounted in an airtight manner to the upper end of the middle case 22, and closes the upper opening of the middle case 22. The upper partition wall member 33 is away upward from the partition wall 22a, and a hollow 45 (hereinafter referred to as a second chamber 45) is formed between the upper partition wall member 33 and the partition wall 22a. The upper partition wall member 33 has a communicating hole (a valve hole) 33a, which vertically penetrates the upper partition wall member 33, at the center. This communicating hole 33a is a flow passage for processed blow-by gas from which the mist oil has been removed.

The upper case 23 is a part that constitutes and separates the upper part of the internal space in the housing 20. The upper case 23 is constituted of a dome-shaped member with open lower surface. This upper case 23 covers the upper partition wall member 33 from above. The edge part of the lower opening of the upper case 23 is mounted in an airtight manner to the peripheral edge portion of the upper partition wall member 33. The peripheral edge portion of the upper partition wall member 33 is interposed between the edge part on the lower opening of the upper case 23 and the upper end of the middle case 22. Specifically, the edge part on the lower opening of the upper case 23 is bonded to the peripheral edge portion of the upper partition wall member 33 by welding, seizing, bolt tightening, or a similar method. The upper case 23 internally forms a hollow 46 (hereinafter referred to as a third chamber 46). The upper partition wall member 33 partitions the third chamber 46 and the second chamber 45, and the communicating hole 33a is communicated between the second chamber 45 and the third chamber 46.

A cylindrical-shaped gas discharge portion 23a is disposed projecting radially outward at a side surface of the upper case 23. This gas discharge portion 23a is coupled to the breather pipe 3. The processed blow-by gas from which the mist oil has been removed passes through the third chamber 46 and then through the gas discharge portion 23a. The blow-by gas is finally discharged to the breather pipe 3. When mounting the upper case 23 to the upper partition wall member 33, adjusting the position of the upper case 23 along the circumferential direction can adjust the direction in which the gas discharge portion 23a projects.

As illustrated in FIG. 8 and FIG. 11 to FIG. 13, the lower case 21 is a part that constitutes and separates the lower part of the internal space in the housing 20. This lower case 21 is constituted of a box-shaped member having a bottom and an opened top surface. The upper end portion of the lower case 21 is fitted to the lower end portion of the middle case 22. The lower case 21 and the middle case 22 are fixed with bolts 25 (see FIG. 2 and FIG. 3). Further, a ring-shaped seal 34 and the lower partition wall member 31 are fitted to the lower end portion of the middle case 22. The peripheral edge portion of the lower partition wall member 31 and the seal 34 are interposed between the upper end portion of the lower case 21 and the lower end portion of the middle case 22. The seal 34 improves the air tightness.

Figure 9:
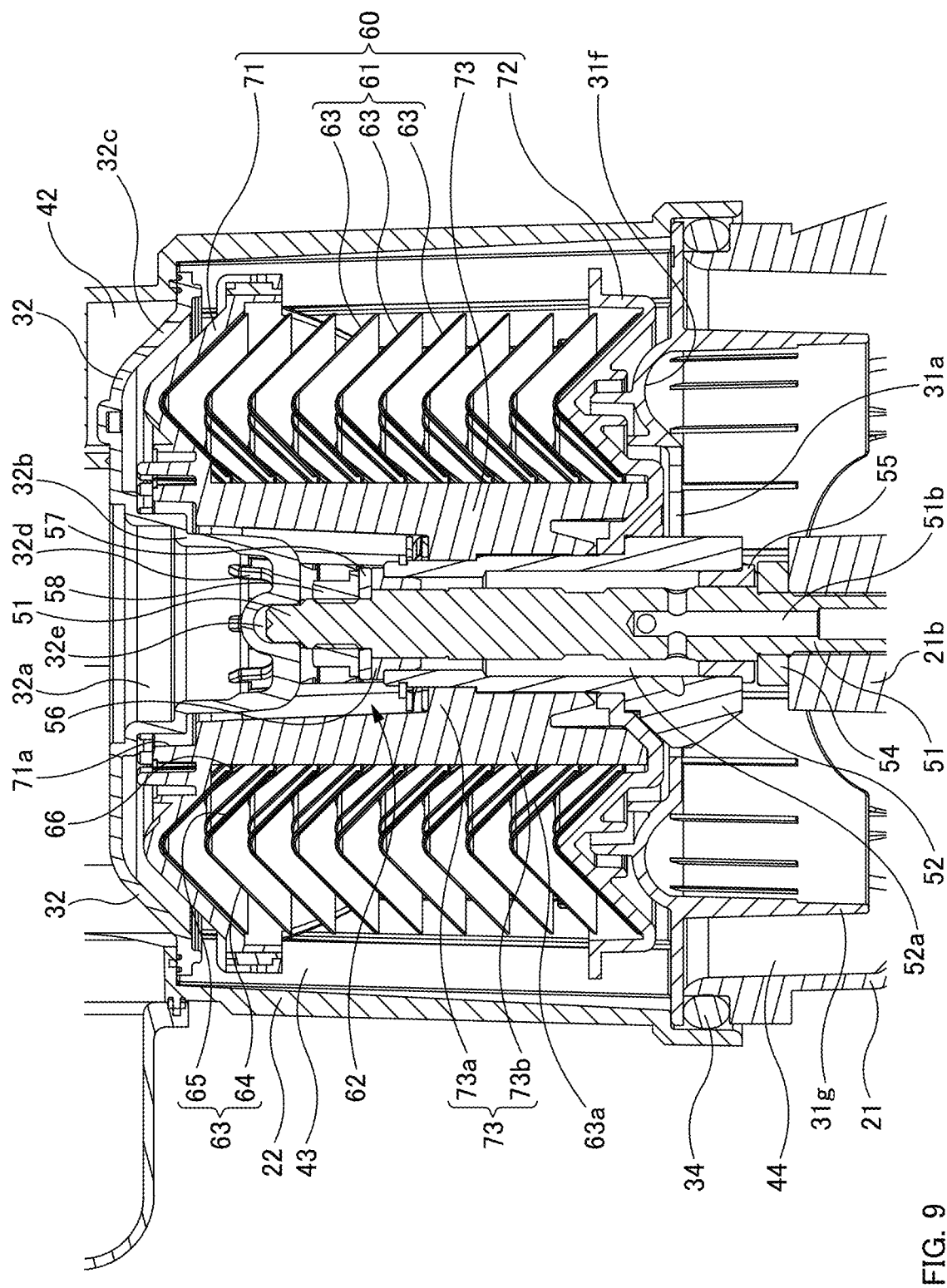
FIG. 9 is an enlarged view of a middle portion of FIG. 5.

As illustrated in FIG. 9, this lower partition wall member 31 is located away from below the middle partition wall member 32 downward. A separation chamber 43 is formed between the middle partition wall member 32 and the lower partition wall member 31. This separation chamber 43 is a part of the hollow in the middle case 22.

The lower partition wall member 31 has a disk shape. The lower partition wall member 31 has a through hole 31a at the center. This lower partition wall member 31 separates as a partition a hollow 44 in the lower case 21 (hereinafter referred to as an injection chamber 44) from the separation chamber 43.

As illustrated in FIG. 8 and FIG. 11 to FIG. 13, the lower case 21 has a communication tube portion 21a facing backward on the back surface. The communication tube portion 21a, which is a tubular member, serves as an outlet for oil injected by nozzles 53 (to be described later). The communication tube portion 21a has an internal space communicated with the internal space in the lower case 21. The communication tube portion 21a has a flange 21d on the outer peripheral surface at the distal end portion. The distal end portion of the communication tube portion 21a and the flange 21d are combined with the side surface of the engine 4 (see FIG. 3). Thus, the internal space in the communication tube portion 21a is communicated with the internal space in the engine 4. The communication tube portion 21a functions as a flow passage for blow-by gas.

The bottom surface of the lower case 21 is inclined downward to the communication tube portion 21a. The lower case 21 internally includes a cylindrical-shaped oil guide pipe 21b extending upward from the bottom surface of the lower case 21. The oil guide pipe 21b has a joint 21c, which faces the bottom surface of the lower case 21, at the lower end. This joint 21c is coupled to the oil supply pipe 10, and the oil supplied from the engine 4 to the oil separator 2 flows upward inside the oil guide pipe 21b. The oil flowing upward inside the oil guide pipe 21b flows to the nozzles 53 (to be described later) through the insides of the spindle shaft 51 and a spindle 52 (to be described later). The joint 21c internally includes a strainer 35 to filter the oil.

Figure 4:
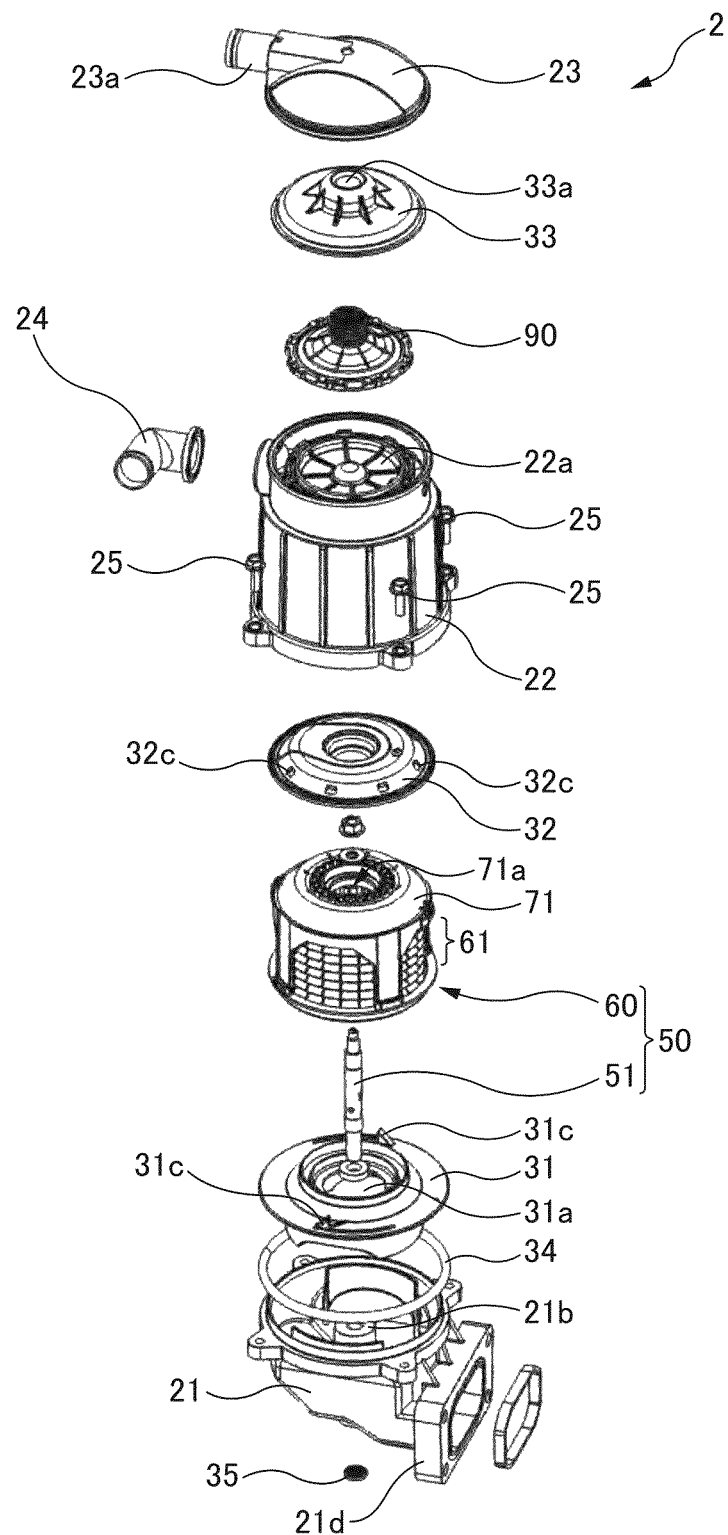
FIG. 4 is an exploded perspective view of the oil separator.
Figure 5:
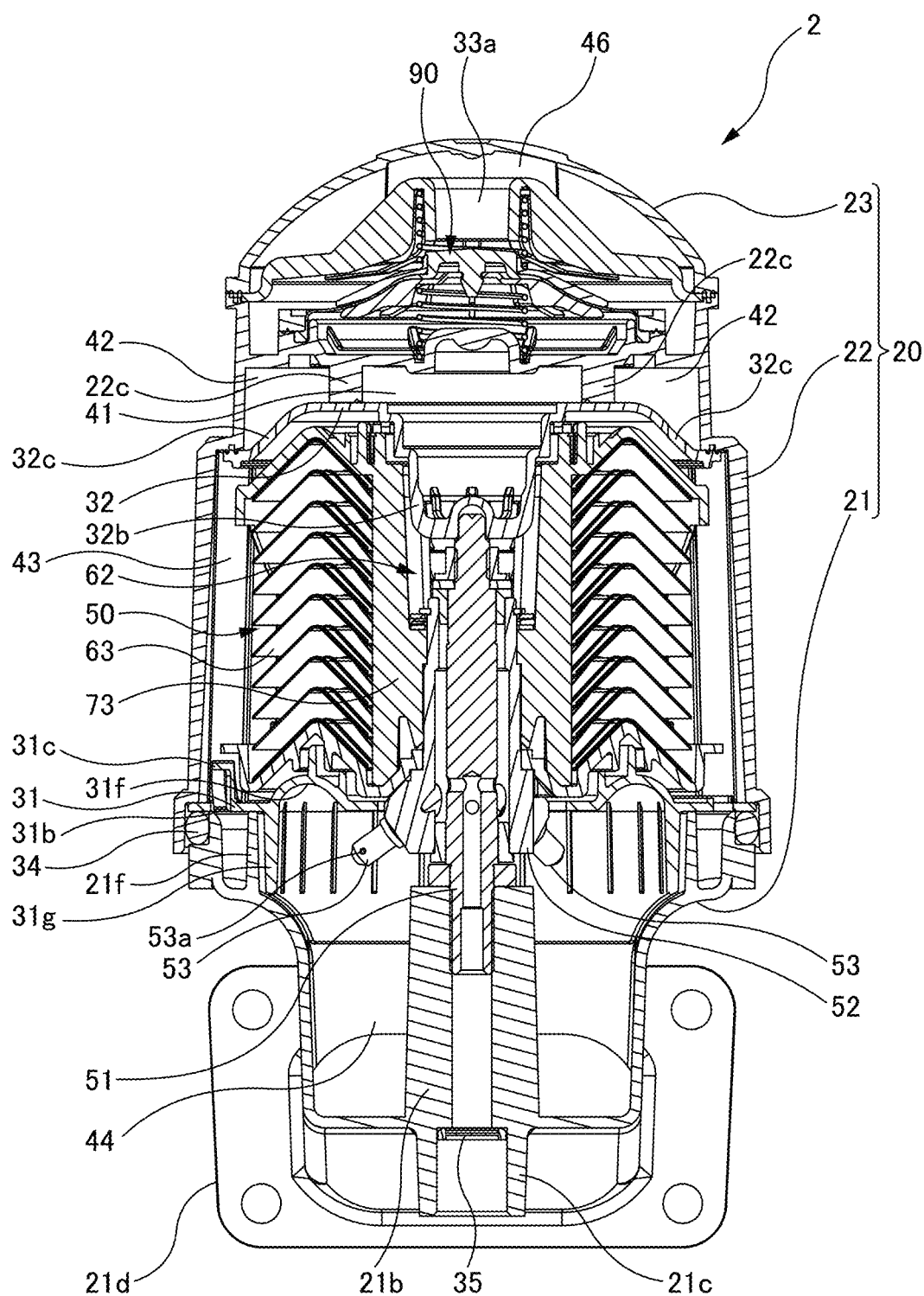
FIG. 5 is a cross-sectional view illustrating a surface taken along V-V illustrated in FIG. 3 viewed in an arrow direction.
Figure 6:
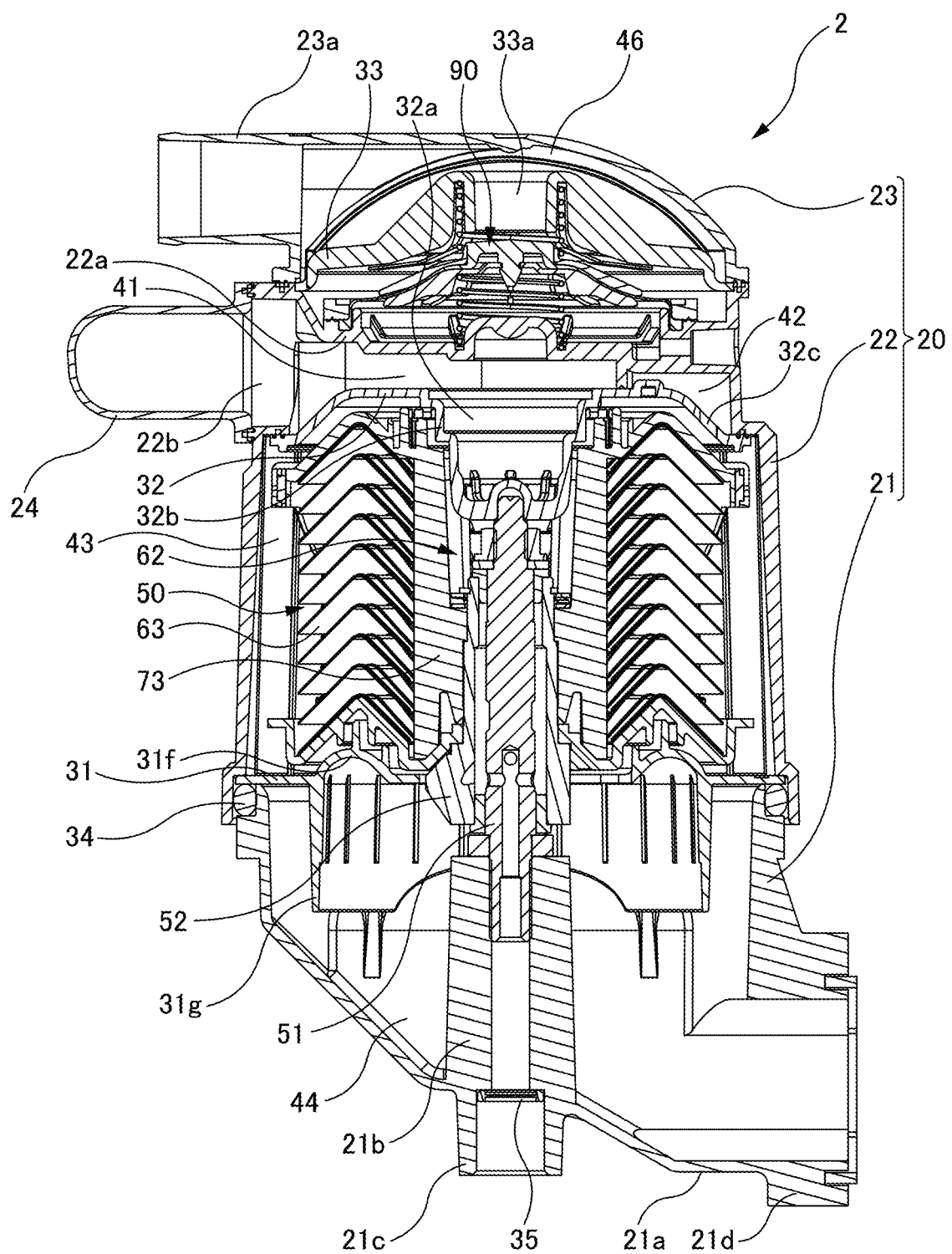
FIG. 6 is a cross-sectional view illustrating a surface taken along VI-VI illustrated in FIG. 3 viewed in an arrow direction.
Figure 14:
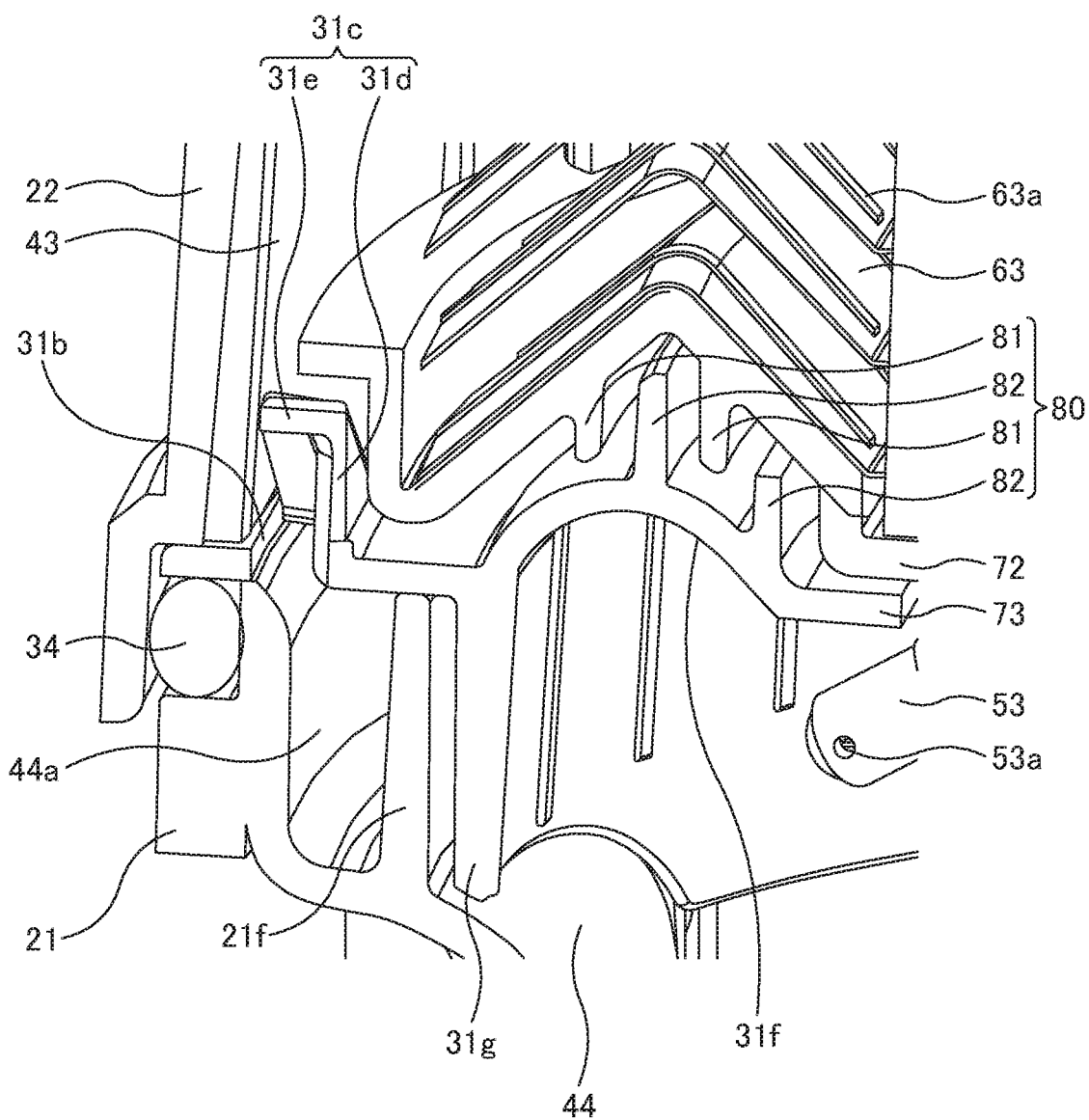
FIG. 14 is an enlarged perspective view illustrating the oil separator cut taken along the V-V cross-sectional surface illustrated in FIG. 3 viewed from a front side, an upper side, and a right side.

As illustrated in FIG. 4, FIG. 5, and FIG. 14, two drain holes 31b are formed in the peripheral edge portion of the lower partition wall member 31. These drain holes 31b are disposed symmetrically about the center of the lower partition wall member 31. These drain holes 31b vertically penetrate the lower partition wall member 31. The drain holes 31b are open nearby the inner peripheral surface of the middle case 22 on the top surface of the lower partition wall member 31. More specifically, the drain holes 31b are disposed along the inner peripheral surface of the middle case 22.

Gates 31c are disposed projecting on the top surface of the lower partition wall member 31. The gates 31c cover the drain holes 31b from above so as not to block the drain holes 31b and are open at one end (for example, counterclockwise viewed from above). Specifically, the gate 31c has a standing wall 31d and a ceiling 31e. The standing wall 31d is disposed upright on the top surface of the lower partition wall member 31 at the inner edge of the drain hole 31b. The ceiling 31e extends radially outward from the upper end of the standing wall 31d. And, the outer radial end portion of the ceiling 31e abuts on the inner peripheral surface of the middle case 22. The ceiling 31e is disposed above the drain holes 31b. And, the ceiling 31e is inclined downward from the one circumferential end of the drain hole 31b to the other circumferential end. The lowest portion of the ceiling 31e is coupled to the other end of the drain hole 31b. An opening surrounded by the ceiling 31e and the one circumferential end of the standing wall 31d is an opening of the gate 31c.

As illustrated in FIG. 8 and FIG. 11 to FIG. 13, an oil returning portion 31f is disposed at the peripheral area of the through hole 31a on the lower surface of the lower partition wall member 31. The oil returning portion 31f has a concave shape. Specifically, a cross-sectional shape of the oil returning portion 31f along the radial direction is in a semicircle.

A tubular oil guard 31g is disposed extending downward from the lower surface of the lower partition wall member 31 at the peripheral area of the oil returning portion 31f. The oil guard 31g is disposed inside with respect to the drain hole 31b.

As illustrated in FIG. 5 and FIG. 14, a pair of wall portions 21f are disposed projecting upward at both right and left sides on the inner surface of the lower case 21. The wall portions 21f are disposed inside with respect to the drain holes 31b. The oil guard 31g is disposed between these wall portions 21f. Upper ends of the wall portions 21f abut on the lower surface of the lower partition wall member 31. A flow passage 44a, which is separated from the injection chamber 44 by the wall portions 21f, is formed outside the wall portions 21f. The flow passage 44a extends in the circumferential direction, and both circumferential ends of the flow passage 44a open to be communicated with the injection chamber 44. The drain holes 31b are disposed on the ceiling surface of the flow passage 44a. The flow passage 44a is communicated with the separation chamber 43 by the drain holes 31b.

Figure 8:
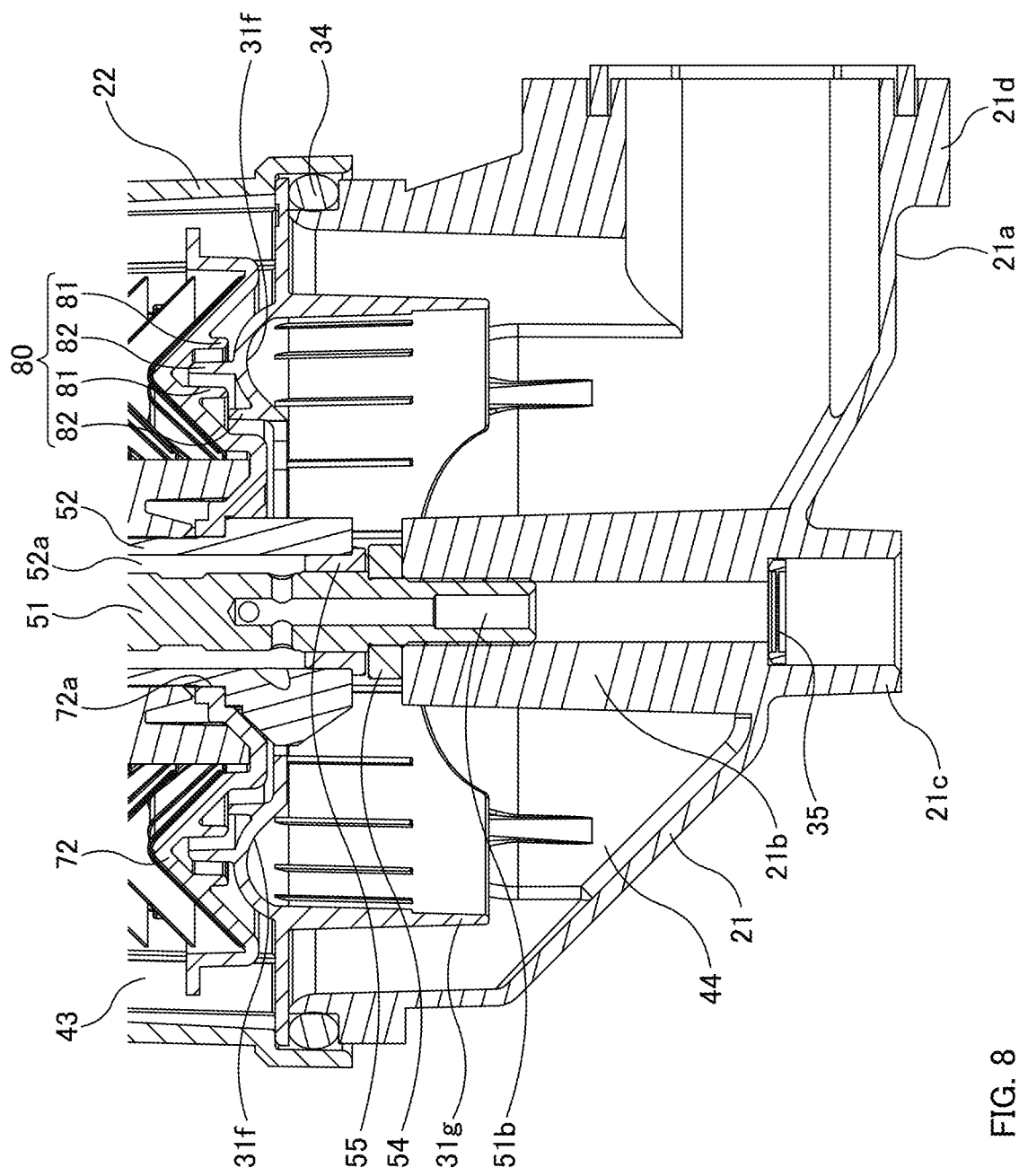
FIG. 8 is an enlarged view of a lower side of FIG. 5.
Figure 15:
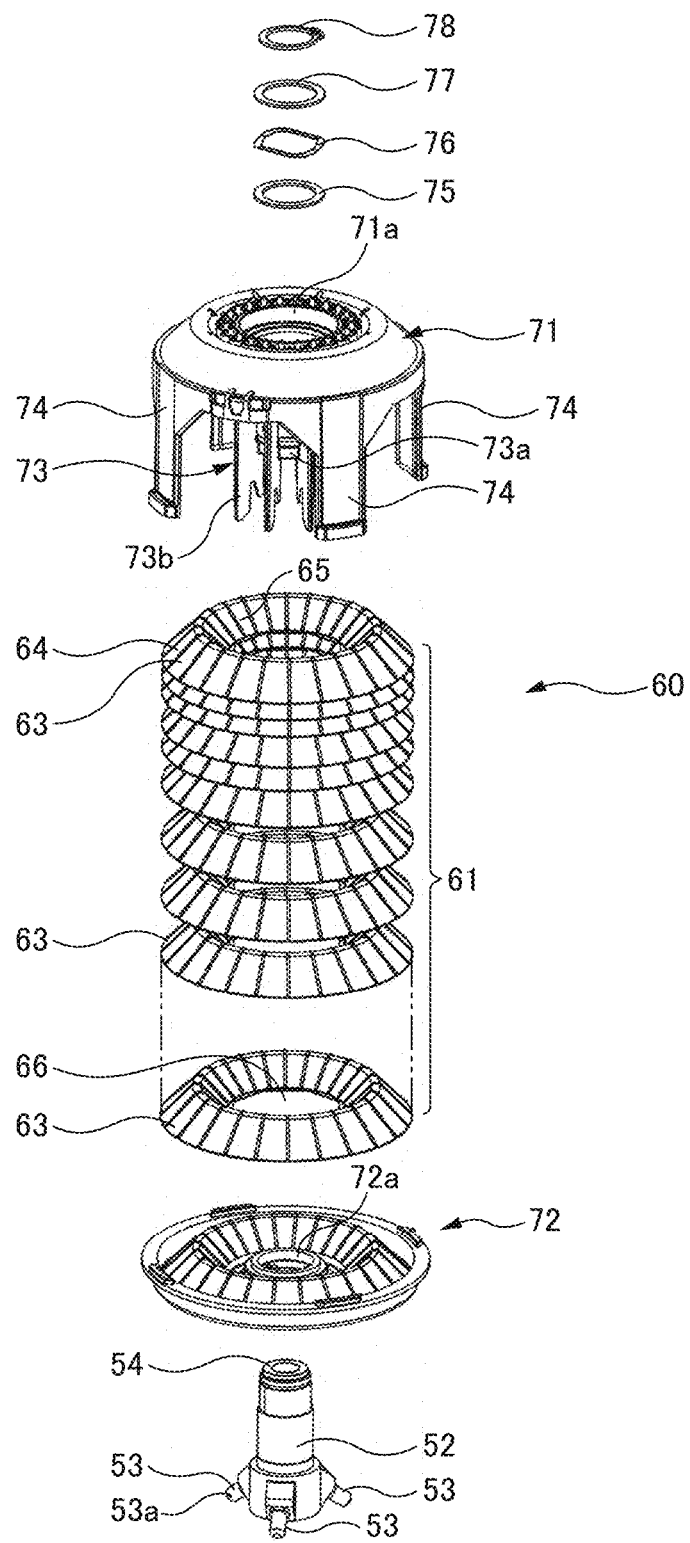
FIG. 15 is an exploded perspective view of a rotor unit.

The following describes the rotor unit 50 in detail with reference to FIG. 8, FIG. 9, and FIG. 15.

The rotor unit 50 is a mechanism to separate the mist oil from the blow-by gas. The rotor unit 50 includes the spindle shaft 51, the spindle 52, the rotor 60, the plurality of nozzles 53, and a similar component. For easy view of the rotor 60, FIG. 15 omits the illustration of the spindle shaft 51.

The spindle shaft 51 is a pillar member. This spindle shaft 51 extends along the up-down direction inside the lower case 21 and the middle case 22, the spindle shaft 51 being inserted through the through hole 31a of the lower partition wall member 31. The lower end portion of the spindle shaft 51 is coupled to the oil guide pipe 21b. The upper end portion of the spindle shaft 51 is inserted into the concave portion 32e on the lower surfaces of the supporting portions 32d, and is supported by the supporting portion 32d and the middle partition wall member 32. The spindle shaft 51 internally includes a first oil supply passage 51b along the center line of the spindle shaft 51. The lower end of the first oil supply passage 51b opens at the lower end surface of the spindle shaft 51 such that the first oil supply passage 51b is communicated with the inside of the oil guide pipe 21b. The upper portion of the first oil supply passage 51b branches into a plurality of passages radially outward at the intermediate portion of the spindle shaft 51. Ends of the first oil supply passage 51b are open at the outer peripheral surface of the spindle shaft 51.

The spindle 52 is a tubular member. The spindle shaft 51 is passed through the inside of this spindle 52. The upper portion of the spindle shaft 51 projects upward from the upper end of the spindle 52. And, the lower portion of the spindle shaft 51 projects downward from the lower end of the spindle 52. A clearance serving as a second oil supply passage 52a is famed between the outer peripheral surface of the spindle shaft 51 and the inner peripheral surface of the spindle 52. At the upper end portion of the spindle 52, a lower bearing 55 is interposed between the outer peripheral surface of the spindle shaft 51 and the inner peripheral surface of the spindle 52. At the lower end portion of the spindle 52, the lower bearing 55 is interposed between the outer peripheral surface of the spindle shaft 51 and the inner peripheral surface of the spindle 52. The oil flowing upward inside the oil guide pipe 21b flows to the nozzles 53 (to be described later) through the insides of the spindle shaft 51 and the spindle 52 (to be described later). The joint 21c internally includes the strainer 35 to filter the oil.

A radial load of the spindle 52 is received by the spindle shaft 51 via the bearings 55 and 56, and the spindle 52 is rotatably supported by the spindle shaft 51. A nut 58 is screwed with the upper end portion of the spindle shaft 51 while the lower end portion of the spindle shaft 51 is inserted into a bearing 54, which is disposed on the top end surface of the oil guide pipe 21b. Between the nut 58 and the bearing 54, interposed are a washer 57, the upper bearing 56, the spindle 52, and the lower bearing 55. A thrust load of the spindle 52 is received by the bearing 54 and the nut 58.

In order to allow the spindle 52 and the bearings 55 and 56 to slightly move along the axial direction, slight clearances are respectively present between the lower bearing 55 and the bearing 54, between the upper bearing 56 and the washer 57, and between the washer 57 and the nut 58. Specifically, while the rotor 60 rotates, the spindle 52 and the bearings 55 and 56 move up along the axial direction. While the rotor 60 stops, the spindle 52 and the bearings 55 and 56 move down.

A slight clearance is also present between the inner peripheral surface of the spindle 52 and the upper bearing 56. The oil inside the oil supply passage 52a flows out to the outside of the spindle 52 through the clearance.

With the spindle 52 being supported to the spindle shaft 51, the spindle 52 is inserted through the through hole 31a on the lower partition wall member 31. The spindle 52 extends upward from the through hole 31a and also extends downward from the through hole 31a. The plurality of nozzles 53 are disposed projecting from the outer peripheral surface of the lower portion of the spindle 52 (especially, a portion lower than the lower partition wall member 31). These nozzles 53 are arranged at regular intervals along the circumferential direction (for example, the intervals of 120°). These nozzles 53 are disposed in the injection chamber 44 and are disposed inside the oil guard 31g. These nozzles 53 inject the oil, and the injection pressure of the oil generates a power to rotate the spindle 52.

The nozzles 53 have a cylindrical shape. A hollow in each nozzle 53 opens at the base end of the nozzle 53, and the hollow in the nozzle 53 is closed at the distal end of the nozzle 53. The base end of the nozzle 53 extends through from the outer peripheral surface to the inner peripheral surface of the spindle 52. The base end of the nozzle 53 is coupled to the spindle 52, and thereby the hollow in the nozzle 53 is communicated with the second oil supply passage 52a. The nozzle 53 is mounted at an angle of 45 degrees obliquely downward with respect to the direction of the axis of the spindle 52. Injection openings 53a are formed at peripheral surfaces on the distal end portions of the nozzles 53 so as to be communicated with the hollows in the nozzles 53. The injection opening 53a faces in the circumferential direction around the axis of the spindle 52. The injection opening 53*a* and the gates 31*c* open in the same circumferential direction.

The rotor 60 is a part which separates the oil mist from the blow-by gas. This rotor 60 has a tubular appearance. The center part of the rotor 60 is configured as a space 62. The center-side space 62 extends through the rotor 60 in the up-down direction, to open the upper and lower sides of the center-side space 62. The spindle 52 is inserted into this center-side space 62, thus combining the spindle 52 and the rotor 60 with one another. Therefore, the rotor 60 rotates together with the spindle 52 because of the injection pressure of the oil by the nozzles 53.

This rotor 60 includes a separation disk group 61, an upper holder 71, a lower holder 72, and a disk holding portion 73. The separation disk group 61 is constituted of a plurality of separation disks 63 stacked in the direction of the axis of the spindle 52. A plurality of convex portions (for example, ribs and projections) are disposed on the top surface and/or the lower surface of each separation disk 63. The convex portions abut on the adjacent separation disk 63 to form a clearance between the stacked separation disks 63. As illustrated in FIG. 8, if the convex portions serve as ribs 63*a*, these ribs 63*a* are radially disposed from the inner peripheral edge to the outer peripheral edge of each of the separation disks 63. Although FIG. 4 to FIG. 11 and FIG. 14 and FIG. 15 draw the separation disks 63 spaced from one another, the actual spaces are extremely narrow, set to be, for example, 0.3 mm or less. The intervals between the separation disks 63 are determined by the height of the convex portions (the ribs 63*a*).

The following describes the separation disk 63 in detail. The separation disk 63 is a body of revolution around the axis of the spindle 52. More specifically, the separation disk 63 has a surface of revolution obtained by rotating an inverted V-shaped curve around the axis of the spindle 52. Since the inverted V-shaped curve is separated radially outward from the axis of the spindle 52, the separation disks 63 have a mounting opening 66 at the center. Stacking the separation disks 63 forms the center-side space 62 formed of these mounting openings 66.

The separation disk 63 includes an inner peripheral part 65 and an outer peripheral part 64 located outside with respect to the inner peripheral part 65.

The inner peripheral part 65 forms the surface of the frustum of a hypothetical inverted circular cone whose apex is located below the axial center of the separation disk 63. Therefore, the inner peripheral part 65 is inclined upward, radially outward. The outer peripheral part 64 forms the surface of the frustum of a hypothetical circular cone whose apex is located above the axial center of the separation disk 63. Therefore, the outer peripheral part 64 is inclined downward, radially outward. The inner peripheral edge of the outer peripheral part 64 is connected to the outer peripheral edge of the inner peripheral part 65, and the outer peripheral part 64 is continuously extends outward from the outer peripheral edge of the inner peripheral part 65. Thus, the outer peripheral part 64 and the inner peripheral part 65 form a single integrated unit. The conical surface means the outer peripheral surface of a frustum.

As described above, the outer peripheral part 64 is bent downward from the outer peripheral edge of the inner peripheral part 65, and the inclination direction of the inner peripheral part 65 is opposite to the inclination direction of the outer peripheral part 64. Since the separation disk 63 is bent between the inner peripheral edge and the outer peripheral edge, the rigidity of the separation disk 63 is improved.

Further, since a corner portion (a ridge portion) interposed between the inner peripheral part 65 and the outer peripheral part 64 is chamfered roundly, the rigidity of the separation disk 63 is improved. Therefore, even a thin separation disk 63 can reduce a deformation of the separation disk 63. The thin separation disks 63 can increase the number of stacked separation disks 63 and the separation efficiency of oil.

Since the separation disk 63 is bent, it is possible to increase a length from the inner peripheral edge to the outer peripheral edge of the separation disk 63 along the disk surface. This ensures a large surface area of the separation disk 63, and improves the separation efficiency of oil.

Further, this can suppress increase of the height of these stacked separation disks 63 even the number of stacked separation disks 63 increases.

Since the separation disk 63 is bent, it is possible to reduce the height of the separation disk 63 itself even if the inclined angles of the inner peripheral part 65 and the outer peripheral part 64 with respect to the radial direction are steep slopes. When the inclined angles of the inner peripheral part 65 and the outer peripheral part 64 with respect to the radial direction are the steep slopes, the separation efficiency of oil is high.

The inclined angle of the inner peripheral part 65 with respect to the radial direction is 45° or less, and the inclined angle of the outer peripheral part 64 with respect to the radial direction is 45° or less. As long as the inclined angles of the inner peripheral part 65 and the outer peripheral part 64 are both 45° or less, the angle of the corner portion interposed between the inner peripheral part 65 and the outer peripheral part 64 is a right angle or an obtuse angle. In the case where the angle of the corner portion interposed between the inner peripheral part 65 and the outer peripheral part 64 is the right angle or the obtuse angle, it is possible to prevent increase of the intervals between the stacked separation disks 63. This allows stacking the larger number of separation disks 63. As long as the inclined angles of the inner peripheral part 65 and the outer peripheral part 64 are 45°, it is possible to prevent increase of interval between the separation disks 63 and also possible to prevent the deterioration of separation efficiency.

As illustrated in FIG. 9, and FIG. 15, the plurality of separation disks 63 described above are attached to the upper holder 71, the lower holder 72, and the disk holding portion 73, to assemble the rotor 60. The separation chamber 43 internally houses this rotor 60.

As described above, devising the shape of the separation disks 63 lowers the height of the rotor 60, thereby ensuring also lowering the height of the separation chamber 43. Further, the distance from the lower partition wall member 31 to the middle partition wall member 32 can be shortened, and thereby the lower partition wall member 31 is arranged higher. Therefore, the nozzles 53 (especially the injection openings 53*a*) can be disposed lower than the lower partition wall member 31 and the lowermost separation disk 63. This can prevent the nozzles 53 from injecting the oil toward the lower partition wall member 31.

As illustrated in FIG. 8 and FIG. 9, since the separation disks 63 are bent, the vertical position of the inner peripheral edges of each separation disk 63 is close to the vertical position of the outer peripheral edge of the same. Preferably, the vertical position of the inner peripheral edge of each separation disk 63 matches with the vertical position of the outer peripheral edge of the same. The lower partition wall member 31 is disposed extending in the circumferential direction and the radial direction. This makes it possible to reduce the vertical length of the separation chamber 43, and thereby the compact housing 20 can be realized.

Even in the case where the nozzles 53 are disposed lower than the lower partition wall member 31, the nozzles 53 are disposed higher and near the lower partition wall member 31. Even with the nozzles 53 disposed higher, the lower partition wall member 31 occupies particular circumferential and radial plane. Therefore, even with the nozzles 53 disposed higher, the oil injected from the nozzles 53 (especially the injection openings 53a) can be avoided to be blown to the lower partition wall member 31. Since the nozzles 53 are disposed near the lower partition wall member 31, the vertical length of the injection chamber 44 can be reduced, and thereby the compact housing 20 can be realized.

As described above, since the oil returning portion 31f is formed in a concave shape, a part opposite the oil returning portion 31f in the top surface of the lower partition wall member 31 is famed in a convex shape. The part opposite to the oil returning portion 31f is in the space below the lowermost separation disk 63 and the lower holder 72, thereby ensuring effective use of the space. This is owing to the mountain fold of the separation disk 63.

As illustrated in FIG. 8, and FIG. 15, the disk holding portion 73 is inserted into the mounting opening 66 of the separation disks 63, and the separation disks 63 are mounted to the disk holding portion 73. The spindle 52 is inserted into the disk holding portion 73, and the outer peripheral surface of the spindle 52 abuts on the disk holding portion 73. A retaining ring 78 and washers 75 to 77 attach the spindle 52 to the disk holding portion 73. This disk holding portion 73 includes a hub portion 73a and a plurality of spoke portions 73b. The hub portion 73a has a ring shape. The spindle 52 is inserted into the hub portion 73a to fix the spindle 52 to the hub portion 73a. Each of the spoke portions 73b has a plate shape extending radially outward from the hub portion 73a. These spoke portions 73b are inserted into the mounting opening 66 of the stacked separation disks 63 along the up-down direction. Since these spoke portions 73b are arranged on the edge of the mounting opening 66 disposed around the circumference, a clearance is formed between the adjacent spoke portions 73b. The spoke portions 73b are fixed to the separation disks 63.

The upper holder 71 holds the plurality of stacked separation disks 63 from above. The lower holder 72 holds these separation disks 63 from below. The separation disks 63 are interposed between the upper holder 71 and the lower holder 72, and thus the upper holder 71 and the lower holder 72 hold the separation disks 63. A plurality of engaging hooks 74 is disposed extending downward from the outer peripheral portion of the upper holder 71. Lower end portions of the engaging hooks 74 are locked to the outer peripheral portion of the lower holder 72.

Similar to the separation disk 63, the upper holder 71 has a surface of revolution obtained by rotating an inverted V-shaped curve around the axis of the spindle 52. Therefore, the inner peripheral part of the upper holder 71 is inclined upward, radially outward, and the outer peripheral part of the upper holder 71 is inclined downward, radially outward. The same applies to the lower holder 72.

Figure 7:
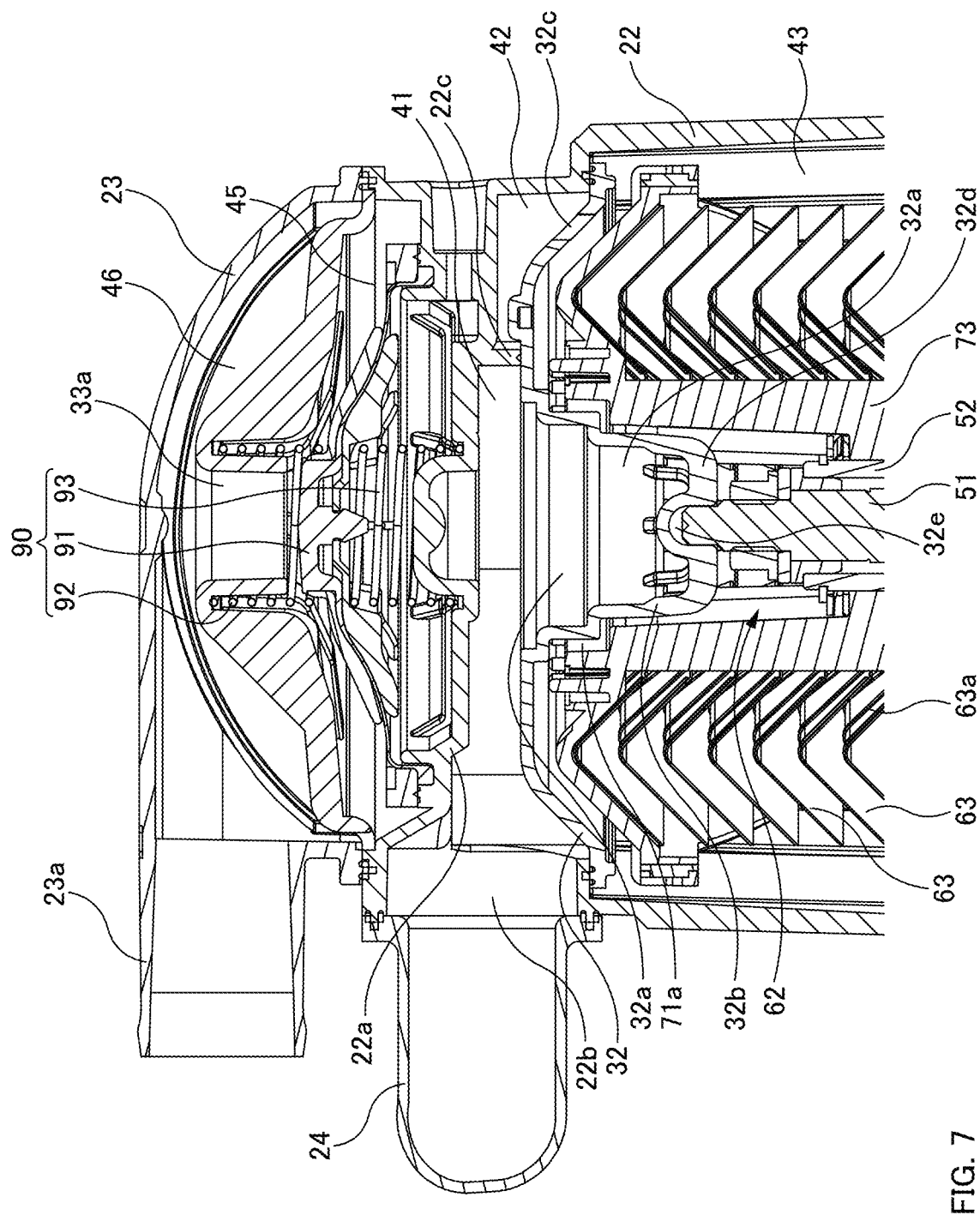
FIG. 7 is an enlarged view of an upper side of FIG. 5.

As illustrated in FIG. 7 and FIG. 15, an opening 71a serving as the upper opening of the center-side space 62 is formed at the center of the upper holder 71. The inner peripheral edge of the upper holder 71 is continuously connected to the upper ends of the spoke portions 73b, and the spoke portions 73b and the upper holder 71 are formed in an integral manner. The fitted portion 32b of the middle partition wall member 32 is inserted into the opening 71a on the upper holder 71.

As illustrated in FIG. 8 and FIG. 15, an opening 72a serving as the lower opening of the center-side space 62 is formed at the center of the lower holder 72. The spindle 52 is inserted into the opening 72a of the lower holder 72. The peripheral portion of the opening 72a is interposed between the outer peripheral surface of the lower portion of the spindle 52 and the lower end of the disk holding portion 73. The retaining ring 78 fixes the spindle 52 to the lower holder 72. The outer peripheral surface of the lower portion of the spindle 52 is bonded to the edge of the opening 72a on the lower holder 72, thus the spindle 52 closes the lower opening of the center-side space 62.

Figure 16:
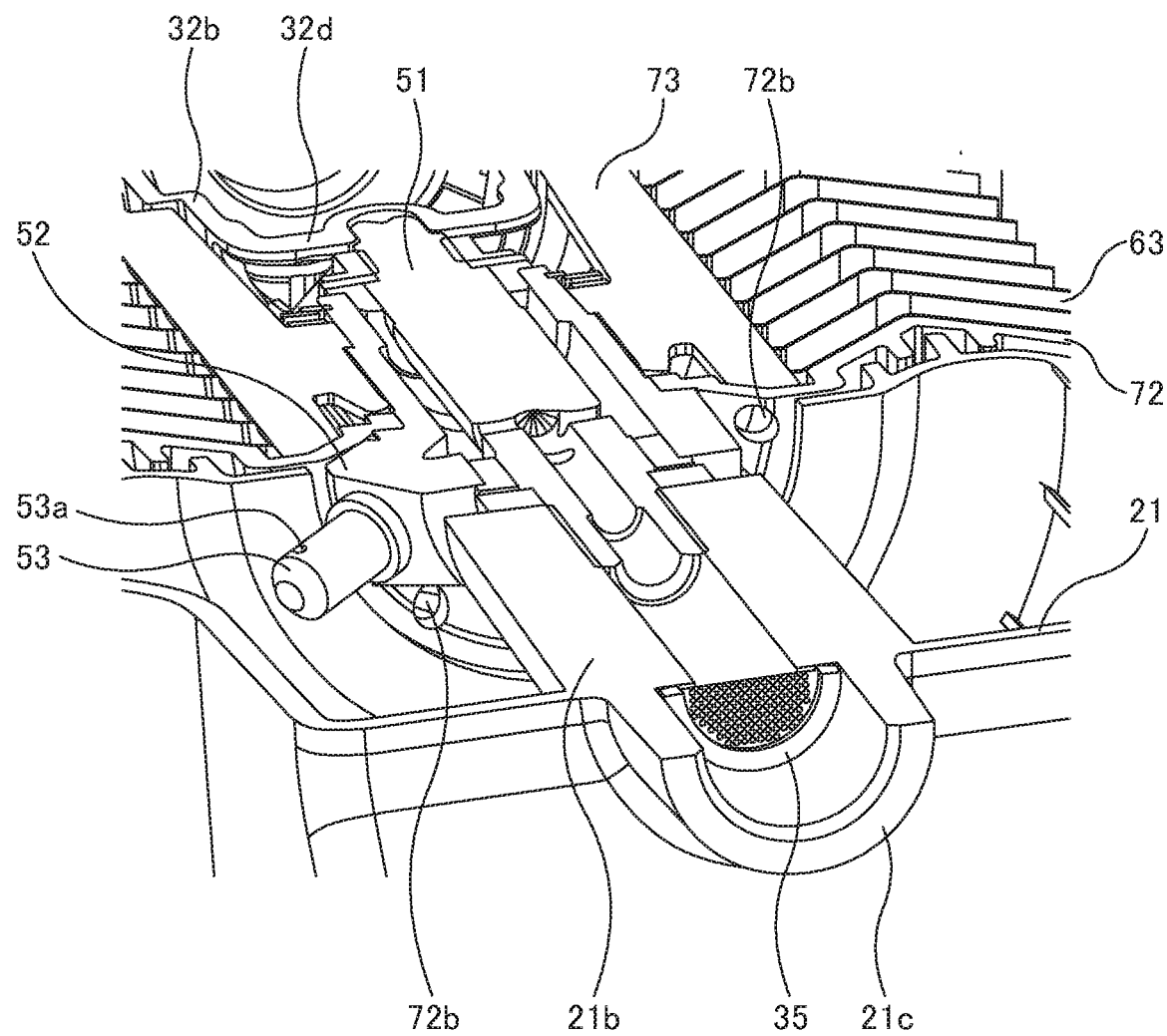
FIG. 16 is an enlarged perspective view illustrating the oil separator cut taken along the V-V cross-sectional surface illustrated in FIG. 3 viewed from a front side, a lower side, and a left side.

As illustrated in FIG. 16, a plurality of pressure control holes 72b are formed on the peripheral portion of the opening 72a of the lower holder 72. The pressure control holes 72b are arranged inside with respect to the edge of the through hole 31a of the lower partition wall member 31, and the center-side space 62 of the rotor 60 is communicated with the injection chamber 44 through the pressure control holes 72b.

Figure 17:
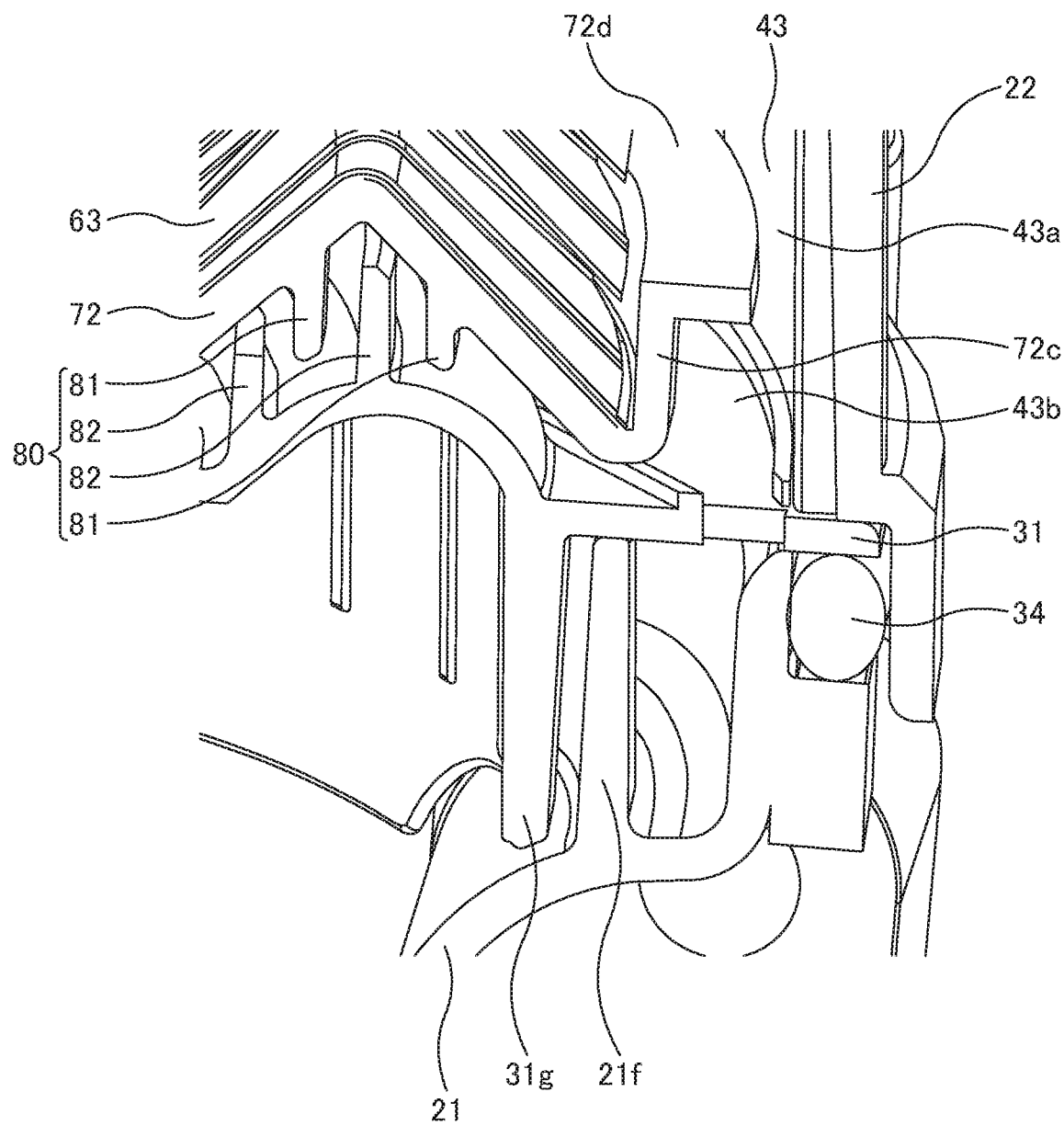
FIG. 17 is an enlarged perspective view illustrating the oil separator cut taken along the V-V cross-sectional surface illustrated in FIG. 3 viewed from a front side, an upper side, and a right side.

As illustrated in FIG. 17, a cylindrical-shaped partition wall 72c is disposed projecting upward on the outer peripheral edge of the lower holder 72. A flange 72d is disposed extending radially outward at the upper end of the partition wall 72c. The outer peripheral edge of the flange 72d is located away from the inner peripheral surface of the middle case 22, and a clearance 43a is formed between the outer peripheral edge of the flange 72d and the inner peripheral surface of the middle case 22. The flange 72d is located away above the top surface of the lower partition wall member 31. An oil process chamber 43b is formed below the flange 72d. The oil process chamber 43b and the separation chamber 43 are communicated through the clearance 43a. The drain holes 31b extend vertically through the lower partition wall member 31 inside the oil process chamber 43b. Further, the gates 31c are disposed below the flange 72d.

When the rotor 60 is attached to the spindle 52, the nozzles 53 are positioned lower than the inner peripheral edge of the inner peripheral part 65 of the lowermost separation disk 63. Further, the nozzles 53 are positioned lower than the outer peripheral edge of the outer peripheral part 64 of the lowermost separation disk 63. Therefore, a part located outside with respect to the nozzles 53 is not surrounded by the separation disks 63. This configuration allows disposing the lower partition wall member 31 along the radial direction as described above. Further, the oil injected by the nozzles 53 does not interfere with the lower partition wall member 31, the rotor 60, and a similar component. Accordingly, it is possible to secure a flying area of the injected oil.

As illustrated in FIG. 7, in a state where the rotor unit 50 is rotatably mounted to and inside the housing 20 as described above, the separation disks 63 extend in the radial direction across below the communication holes 32c on the middle partition wall member 32. Therefore, the communication holes 32c are disposed inside with respect to the outer peripheral edges of the separation disks 63.

As illustrated in FIG. 8, a labyrinth seal 80 is disposed between the lower surface of the lower holder 72 and the top surface of the lower partition wall member 31. The labyrinth seal 80 includes a plurality of first seal fins 81 and a plurality of second seal fins 82. The first seal fins 81 project from the lower surface of the lower holder 72 toward the lower partition wall member 31 disposed below. These first seal fins 81 have a ring shape so as to surround the opening 72a of the lower holder 72, and are concentrically disposed around the opening 72a. Therefore, a ring-shaped groove is formed between these first seal fins 81. The second seal fins 82 project from the top surface of the lower partition wall member 31 toward the lower holder 72 disposed above. These second seal fins 82 have a ring shape so as to surround the through hole 31a of the lower partition wall member 31, and are concentrically disposed around the through hole 31a. Therefore, a ring-shaped groove is famed between these second seal fins 82.

The first seal fins 81 and the second seal fins 82 are disposed meshing with one another. That is, one of the first seal fins 81 is inserted into the groove between the second seal fins 82 with a clearance, and one of the second seal fins 82 are inserted into the groove between the first seal fins 81 with a clearance.

Subsequently, the following describes the PCV valve 90 in detail with reference to FIG. 7. The PCV valve 90 adjusts a flow rate of the recirculated blow-by gas, and thereby appropriately adjusts the intake air pressure of the engine 4 and a pressure at the crankcase side. Specifically, the PCV valve 90 adjusts the level of the opening of the communicating hole 33a of the upper partition wall member 33, and thereby adjusts the flow rate of the blow-by gas.

The PCV valve 90 is mounted in the second chamber 45. This PCV valve 90 includes a diaphragm 91, an upper spring 92, and a lower spring 93. The diaphragm 91 is a disk-shaped valve element manufactured by molding a rubber and a resin. This diaphragm 91 is housed inside the second chamber 45 and disposed below the communicating hole 33a of the upper partition wall member 33. The outer edge portion of this diaphragm 91 is bonded to the top surface of the partition wall 22a. The communication hole 22d of the partition wall 22a is disposed outside with respect to the outer edge portion of the diaphragm 91.

The upper spring 92 and the lower spring 93 are elastic members to support the center of the diaphragm 91 to be movable in the up-down direction. The upper spring 92 is placed right above the center of the diaphragm 91 and between the diaphragm 91 and the upper partition wall member 33. The lower spring 93 is placed right below the center of the diaphragm 91 and between the diaphragm 91 and the partition wall 22a. The diaphragm 91 is interposed between these upper spring 92 and lower spring 93 so as to be movably supported.

Subsequently, the following describes operations of the oil separator 2.

The oil supplied from the engine 4 to the oil separator 2 flows through the oil guide pipe 21b, through the first oil supply passage 51b, through the second oil supply passage 52a into the nozzles 53. The oil inside the nozzles 53 is injected from the injection openings 53a. The direction of injecting the oil from the injection openings 53a is a circumferential direction around the axis of the spindle 52. More specifically, the direction of injecting the oil is a direction perpendicular to the axis of the spindle 52. In the case where the axis of the spindle 52 is aligned with the vertical direction, the direction of injecting the oil is the horizontal direction. The injection pressure of the oil rotates the spindle 52 and the rotor 60 around the axis of the spindle 52. The direction of rotation of the spindle 52 and the rotor 60 is a direction opposite to the direction of injecting the oil.

There may be a case where the rotor 60 performs a precession during the rotation of the rotor 60. However, as described above, by devising the shape of the separation disks 63, the height of the rotor 60 decreases, and the center of gravity of the rotor 60 is close to a fulcrum of the precession. Accordingly, a swing width of the axis of the rotor 60 is small, ensuring a reduction of the precession in the rotor 60. This makes it possible to increase the rotation speed of the rotor 60.

By devising the shape of the separation disk 63, the height of the rotor 60 decreases and an air resistance by the rotor 60 is small. This makes it possible to increase the rotation speed of the rotor 60.

The oil injected from the injection openings 53a is sprayed to the oil guard 31g. This ensures preventing the injected oil from rushing into the drain holes 31b.

The oil sprayed to the oil guard 31g flows down along the oil guard 31g and the inner peripheral surface of the lower case 21. Since the temperature of the oil is high, 80 to 110° C., the oil warms the oil separator 2 from the lower case 21 side. Even the use in a cold area, this ensures reducing operational failures of the oil separator 2 due to freezing or the like. The flowing-down oil passes through from the bottom portion in the lower case 21 to communication tube portion 21a, and is returned to the engine 4.

The oil separator 2 oscillates due to automobile motion such as acceleration, deceleration, turn, vibration and inclination. In association with this, the oil inside the injection chamber 44 vibrates and causes a sloshing of a liquid surface of the oil. Even in such a case, the oil returning portion 31f blocks the oil and returns the oil to the inside in the radial direction. This makes it possible to suppress the oil from passing through the through hole 31a to flow onto the lower partition wall member 31. Further, this also makes it possible to suppress the nozzles 53 from being bathed in the oil inside the injection chamber 44. This can prevent the spindle 52 and the rotor 60 from decreasing their rotation speeds, the decreasing being caused by the reduction in injection pressure of the nozzles 53.

During the rotation of the spindle 52 and the rotor 60, the blow-by gas containing the mist oil passes through the gas introduction pipe 5 from the engine 4, and is supplied to the oil separator 2. The blow-by gas is introduced into the introduction path 41 through the suction pipe 24 and the inlet hole 22b. The blow-by gas passes from the introduction path 41 through the hollow in the fitted portion 32b and the opening 71a of the upper holder 71. And, the blow-by gas flows into the inside of the disk holding portion 73 (more specifically, the insides of the spoke portions 73b). The blow-by gas flowing into the inside of disk holding portion 73 flows outward through the clearance between the spoke portions 73b, and flows into the clearances between the separation disks 63. The blow-by gas flowing into the clearances between the separation disks 63 flows outward in the radial direction. Then, on the blow-by gas, exerted is the centrifugal force by the rotation of the rotor 60 as well as a pressure from upstream (a gas supply pressure from the engine 4 to the oil separator 2). That is, because of the centrifugal force by the rotation of the rotor 60, a suction pressure is generated which suctions the blow-by gas in the introduction path 41 to the inside of the disk holding portion 73. As a result, a flow speed of the blow-by gas increases.

Meanwhile, the oil in the second oil supply passage 52a flows out to the inside of the disk holding portion 73 through a slight clearance between the upper bearing 56 and the inner peripheral surface of the spindle 52 (more specifically, the insides of the spoke portions 73b). The temperature of the oil is high, 80 to 110° C.; therefore, the oil warms the rotor 60 and nearby the rotor 60 from the inside. Even the use in a cold area, this ensures reducing operational failures of the oil separator 2 due to freezing or the like.

The oil flowing out from the second oil supply passage 52*a* to the inside of the disk holding portion 73 flows into the clearances between the separation disks 63 together with the blow-by gas. The oil in the clearances between the separation disks 63 spreads to the surfaces of the separation disks 63 due to the centrifugal force. And, oil films are formed on the surfaces of the separation disks 63. Mainly, the oil films are formed on the top surfaces of the inner peripheral parts 65 and the lower surfaces of the outer peripheral parts 64 of the separation disks 63. The oil films on the surfaces of the separation disks 63 contain not only the oil flowing out from the second oil supply passage 52*a* to the inside of the disk holding portion 73, but also the oil separated from the blow-by gas as described later.

When the blow-by gas flows to the clearances between the separation disks 63, the oil films on the surfaces of the separation disks 63 absorb the oil-like mist contained in the blow-by gas. Thus, the separation disks 63 capture the mist oil in the blow-by gas to separate the mist oil from the blow-by gas. As described above, since the surface area of each separation disk 63 is large and the number of stacked separation disks 63 is also large, the separation disks 63 easily capture the mist oil, thereby featuring the high separation efficiency of oil.

The oil flowing out from the second oil supply passage 52*a*, as well as the oil separated from the blow-by gas, are constituents of the oil films on the surfaces of the separation disks 63; therefore, this forms the sufficient oil films on the surfaces of the separation disks 63. Since the oil films absorb the mist oil in the blow-by gas, the separation efficiency of mist oil is high.

A physical property (wettability) of the oil flowing out from the second oil supply passage 52*a* is identical to a physical property (wettability) of the mist oil in the blow-by gas. Therefore, affinity of the oil flowing out from the second oil supply passage 52*a* with the mist oil in the blow-by gas is high, and further, affinity of the mist oil in the blow-by gas with the oil films on the surfaces of the separation disks 63 is high. Accordingly, the mist oil in the blow-by gas is likely to be absorbed into the oil films on the surfaces of the separation disks 63, and the separation efficiency of mist oil is high.

The already-processed blow-by gas from which the oil mist has been removed is discharged from the outer peripheries of the clearances between the separation disks 63 and then moves up in the separation chamber 43. The already-processed blow-by gas that has moved up passes through the communication holes 32*c* from the separation chamber 43, and flows into the first chamber 42. And, from the first chamber 42, the blow-by gas further passes through the communication hole 22*d* into the second chamber 45. The blow-by gas passes from the second chamber 45 through the communicating hole 33*a* of the upper partition wall member 33, through the third chamber 46, through the gas discharge portion 23*a*, and the blow-by gas is discharged to the breather pipe 3. Thus, the blow-by gas recirculates to the engine 4. When the blow-by gas flows from the communication holes 32*c* to the inside of the first chamber 42, the flow speed of the blow-by gas decreases inside the first chamber 42. Similarly, the flow speed of the blow-by gas also decreases insides the second chamber 45 and the third chamber 46.

The separation chamber 43 is communicated with the oil process chamber 43*b* only via the clearance 43*a*. The pressure of the blow-by gas discharged from the clearances between the separation disks 63 acts on the clearance 43*a*. Therefore, this ensures preventing the blow-by gas inside the crankcase of the engine 4 from flowing into the separation chamber 43 through a passage such as the communication tube portion 21*a*, the injection chamber 44, the drain holes 31*b*, the oil process chamber 43*b* and the clearance 43*a*.

The labyrinth seal 80 is disposed between the lower surface of the lower holder 72 and the top surface of the lower partition wall member 31. This avoids a leakage of the blow-by gas between the separation chamber 43 and the injection chamber 44.

When the already-processed blow-by gas passes through the communicating hole 33*a* of the upper partition wall member 33, the flow rate of the blow-by gas is adjusted. That is, with the excessively large intake air pressure (negative pressure) of the engine 4, the center of the diaphragm 91 moves upward and the opening of the communicating hole 33*a* narrows, reducing the flow rate of the blow-by gas. Meanwhile, in the case where the pressure on the crankcase side is high, the center of the diaphragm 91 moves downward and the opening of the communicating hole 33*a* widens, increasing the flow rate of the blow-by gas. This appropriately adjusts the flow rate of the blow-by gas using the diaphragm 91. The engine 4, especially the pressure of the crankcase is appropriately adjusted.

The oil attached to the surfaces of the separation disks 63 flows outward along the surfaces of the separation disks 63 due to the centrifugal force. Especially, at the part where each separation disk 63 is bent, the oil on the outer edge of the top surface of the inner peripheral part 65 jumps due to the centrifugal force to the lower surface of the outer peripheral part 64 of an above-adjacent separation disk 63.

On the outer peripheral edges of the separation disks 63, the oil attached to the surfaces of the separation disks 63 is emitted outside from the outer peripheries of the clearances between the separation disks 63 due to the centrifugal force. More specifically, since the separation disks 63 rotate at a high speed, the emitted oil flies in a direction of a resultant force combining the radially-outward centrifugal force and a tangential rotary inertia force, as viewed from the above. Further, the outer peripheral parts 64 of the separation disks 63 are inclined downward, radially outward; therefore, when viewed laterally, the emitted oil flies radially outward and obliquely downward. This can prevent the emitted oil from dispersing into the moving-up blow-by gas and turning into the mists. Accordingly, the blow-by gas discharged from the oil separator 2 hardly contains the oil.

This can prevent updraft of the blow-by gas from blowing the flying oil into the communication holes 32*c* on the middle partition wall member 32. This is because that the communication holes 32*c* are disposed inside with respect to the outer peripheral edges of the separation disks 63.

The flying oil is attached to the inner peripheral surface of the middle case 22. The oil flows downward along the inner peripheral surface of the middle case 22 in a spiral pattern due to the inertia force generated by the flying. The oil passes through the clearance 43*a* between the outer peripheral edge of the flange 72*d* and the inner peripheral surface of the middle case 22, and flows into the oil process chamber 43*b*. The oil that has reached the top surface of the lower partition wall member 31 flows in the circumferential direction, and flows into the openings on the gates 31*c*. Thus, the rotation of the rotor 60 is utilized to the flow of oil, efficiently flowing the oil into the openings on the gates 31*c*. Further, wind generated by the rotation of the rotor 60 pushes the oil into the openings on the gates 31*c*. This causes the oil to pass through the gates 31c and the drain holes 31b from the oil process chamber 43b and to be discharged to the injection chamber 44. The oil discharged inside the injection chamber 44 is mixed with the oil spouted from the nozzles 53, and the mixed oil is discharged from the injection chamber 44 through the communication tube portion 21a.

The separation chamber 43 is communicated with the oil process chamber 43b only via the clearance 43a. The pressure inside the oil process chamber 43b is lower than the pressure inside the separation chamber 43. And, a difference between the pressure inside the oil process chamber 43b and the pressure inside the injection chamber 44 is small. The oil inside the oil process chamber 43b continuously flows into the drain holes 31b, thereby a backflow of the oil is less likely to occur.

The oil attached to the inner peripheral surface of the middle case 22 is pushed upward by the updraft of the blow-by gas. Even so, the communication holes 32c on the middle partition wall member 32 are disposed inside with respect to the inner peripheral surface of the middle case 22, and this can suppress the attached oil from getting into the communication holes 32c.

Even supposing that the oil pushed up by the updraft of the blow-by gas inside the separation chamber 43 flows in the communication holes 32c on the middle partition wall member 32, the oil remains in the first chamber 42. Especially, since the flow speed of the blow-by gas decreases inside the first chamber 42, the oil is likely to remain inside the first chamber 42. For example, the oil is attached to the inner wall surface of the first chamber 42 and remains inside the first chamber 42. Therefore, it is possible to prevent the oil from attaching to the PCV valve 90, and also the blow-by gas discharged from the oil separator 2 hardly contains the oil.

The second chamber 45 and the third chamber 46 are disposed in the middle of the path from the first chamber 42 to the gas discharge portion 23a. The second chamber 45 and the third chamber 46 become a space for oil to remain like the first chamber 42. Therefore, the blow-by gas discharged from the oil separator 2 hardly contains the oil.

The blow-by gas inside the crankcase of the engine 4 passes through the inside of the communication tube portion 21a, and also flows into the inside of the injection chamber 44. The mist oil contained in the blow-by gas collides with the oil injected from the nozzles 53 and is captured. This separates the mist oil from the blow-by gas.

The blow-by gas inside the injection chamber 44 passes through a plurality of pressure control holes 72b on the lower holder 72, and flows into the center-side space 62 of the rotor 60. The blow-by gas flowing from the injection chamber 44 into the center-side space 62 is mixed with the blow-by gas flowing from the introduction path 41 into the center-side space 62. As described above, the mixed blow-by gas flows in the clearances between the separation disks 63 to the outer peripheral side, and the mist oil is separated from the blow-by gas.

In an abnormal case (for example, when the gas introduction pipe 5 freezes), the flow rate of the blow-by gas flowing from the introduction path 41 to the center-side space 62 decreases. Even in such a case, regarding the blow-by gas passing from the engine 4 through the communication tube portion 21a through the injection chamber 44 through the pressure control holes 72b and flowing into the center-side space 62, the flow rate thereof increases. Therefore, even in an abnormal case, the oil-like mist is continuously separated from the blow-by gas.

The description of the above-described embodiments is for ease of understanding of the present invention and does not limit the present invention. The present invention may be modified or improved without departing from the gist and includes the equivalents. The following describes points changed from the above-described embodiments. The respective changes described below may be applied in combination.

The above-described embodiments describe the blow-by gas as the processing-target gas as the example. However, as long as the gas contains the mist oil to be the target for separation, the gas can be the processing-target gas.

The above-described embodiments describe the example where the inner peripheral part 65 and the outer peripheral part 64 of each separation disk 63 forms the surface of the frustum of a hypothetical circular cone. Meanwhile, the inner peripheral part 65 and the outer peripheral part 64 may forms the surface of a different type of frustum. For example, the separation disk 63 may be a body having a rotational symmetry around the axis of the spindle 52, and the inner peripheral part 65 and the outer peripheral part 64 may form the surface of the frustum of a hypothetical polygonal pyramid (for example, triangular pyramid, quadrangular pyramid, or the like). The generator (s) of the inner peripheral part 65 and/or the outer peripheral part 64 may not be a straight line, but may be a curved line with a predetermined curvature (for example, an arc, an elliptic curve, a parabolic curve, and a hyperbolic curve).

Also, the separation disk 63 may form the surface of any type of frustum without bending.

The above-described embodiments describe that the rotational powers from the rotor 60 and the spindle 52 is generated by utilizing the hydraulic pressure of the oil supplied from the engine 4. On the other hand, the power from the engine 4 may be transmitted to the rotor 60 and the spindle 52 by a power transmission mechanism (such as a belt transmission mechanism, a gear transmission mechanism, and a chain transmission mechanism) to rotate the rotor 60 and the spindle 52. Also, a power source independent from the engine 4 (for example, an electric motor) may rotate the rotor 60 and the spindle 52.

The above-described embodiments describe that the oil separator 2 is mounted to the side surface of the engine 4 (see FIG. 1); however, the part where the oil separator 2 is mounted is not limited to the side surface of the engine 4. For example, the oil separator 2 may be mounted to the front surface, the rear surface, the top surface, or the lower surface of the engine 4. Further, the oil separator 2 may be mounted not to the engine 4 but to a vehicle body (especially, an engine compartment). As necessary, an oil flow pipe plumbed from the communication tube portion 21a to the engine 4 may be installed.

The above-described embodiments describe that the ventilation system 1 is a closed system where the blow-by gas processed by the oil separator 2 passes through the breather pipe 3 and is restored to the intake-side flow passage 6. In contrast to this, the ventilation system 1 may be an atmosphere-open system where the blow-by gas processed by the oil separator 2 is discharged to the atmosphere. The ventilation system 1 of the atmosphere-open system may include the PCV valve 90 as described above or may not include the PCV valve 90.

Figure 18:
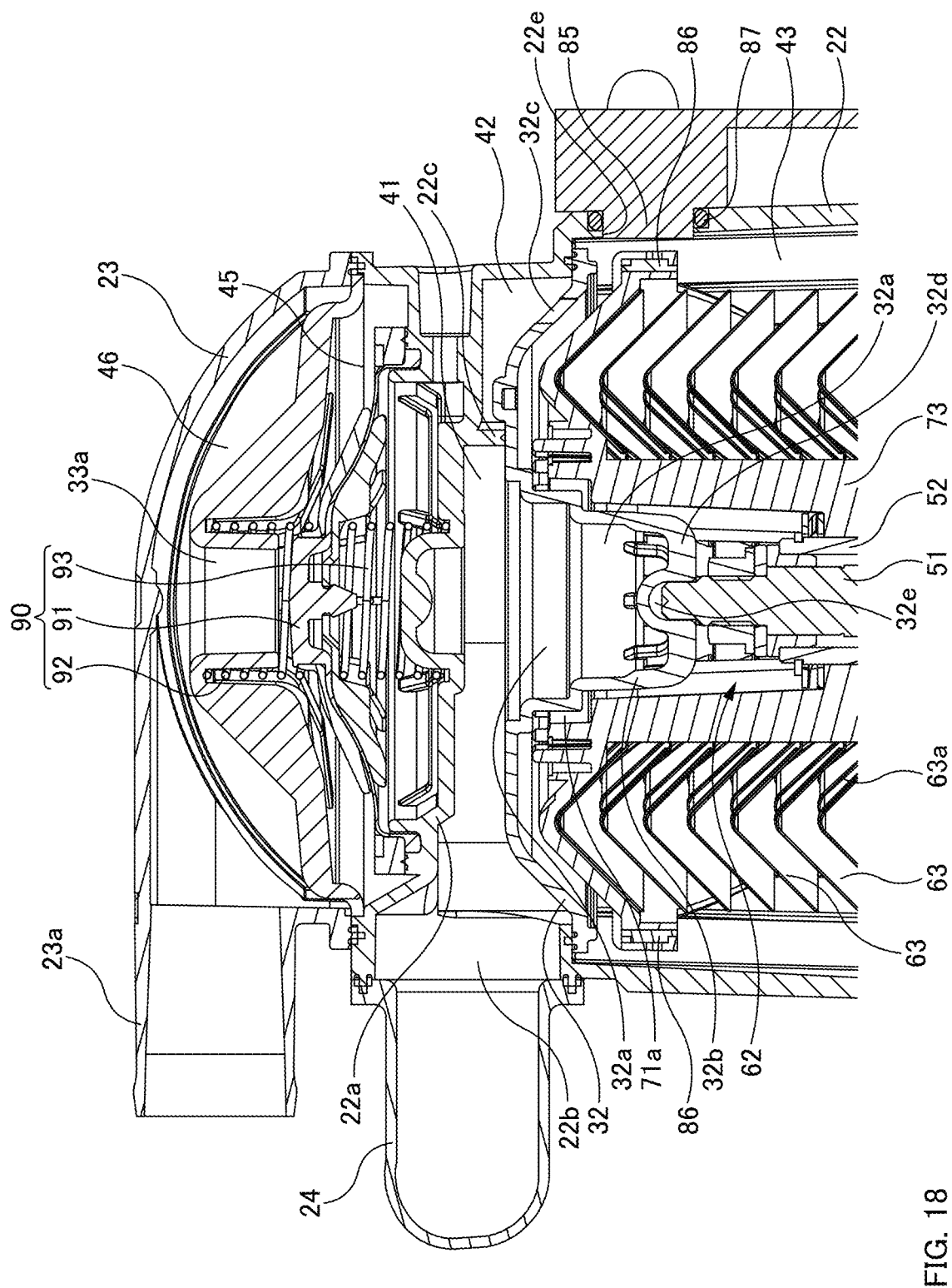
FIG. 18 illustrates an oil separator according to a modification and is a cross-sectional view corresponding to FIG. 7.

The above-described embodiments describe that neither the rotation speed nor the number of rotations of the rotor 60 is detected. In contrast to this, the rotation speed or the number of rotations of the rotor 60 may be detected using a magnetic sensor 85 and a plurality of permanent magnets 86, as illustrated in FIG. 18. The plurality of permanent magnets 86 are arranged at regular intervals on the outer peripheral surface of the upper holder 71 along the circumferential direction. Meanwhile, the magnetic sensor 85 is mounted to a mounting hole 22e, which is famed on the rear surface of the upper portion of the middle case 22. A ring-shaped rubber seal 87 is interposed between the inner surface of the mounting hole 22e and the outer surface of the magnetic sensor 85. The magnetic sensor 85 is, for example, a Hall element. During the rotation of the rotor 60, the permanent magnets 86 approach the magnetic sensor 85 and when the magnetic sensor 85 detects the passing of the permanent magnets 86, the magnetic sensor 85 outputs pulses. Since the magnetic sensor 85 is exposed inside the middle case 22, detection accuracy by the magnetic sensor 85 is high.

REFERENCE SIGNS LIST 1 closed crankcase ventilation system, 2 oil separator, 20 housing,
21 lower case,
22 middle case (case), 22a partition wall (first partition wall), 22b inlet hole,
22c rib, 22d communication hole (second communication hole), 22e mounting hole,
23 lower case, 23a gas discharge portion,
24 pipe,
31 lower partition wall member, 31a through hole, 31b drain hole,
31c gate, 31d standing wall, 31e ceiling, 31g oil guard,
32 middle partition wall member (second partition wall), 32b fitted portion,
32c communication hole (first communication hole),
33 upper partition wall member, 33a communicating hole,
35 strainer,
41 space (introduction path), 42 space (first chamber),
43 space (separation chamber), 44 hollow (injection chamber),
45 hollow (second chamber), 46 hollow (third chamber),
50 rotor unit,
51 spindle shaft, 51b first oil supply passage,
52 spindle, 52a second oil supply passage,
53 nozzle, 53a injection opening,
54 bearing, 55 lower bearing, 56 upper bearing,
60 rotor, 61 separation disk group, 62 center-side space,
63 separation disk, 63a rib,
64 outer peripheral part of separation disk,
65 inner peripheral part of separation disk,
66 mounting opening,
71 upper holder, 71a opening,
72 lower holder, 72a opening, 72b pressure control hole,
72c standing wall,
73 disk holding portion, 73a hub portion, 73b spoke portion,
74 hook,
80 labyrinth seal, 81 first seal fin, 82 second seal fin,
85 magnetic sensor, 86 permanent magnet, 87 seal,
90 PCV valve, 91 diaphragm, 92 upper spring, 93 lower spring

The invention claimed is:
1. An oil separator that separates mist oil from processing-target gas containing the mist oil, comprising:
a tubular case having an internal space and an inlet hole which is communicated with the internal space;
a first partition wall partitioning the internal space into a space with which the inlet hole is communicated and a space located above the space;
a second partition wall disposed in the internal space lower than the first partition wall,
the second partition wall vertically partitioning a space of the internal space located lower than the first partition wall;
a partition portion disposed between the first partition wall and the second partition wall,
the partition portion dividing a space between the first partition wall and the second partition wall into an introduction path and a first chamber,
the introduction path being communicated with the inlet hole,
the first chamber being separated away from the inlet hole;
a supply hole disposed inside the introduction path and communicated with above and below the second partition wall;
a communication hole disposed inside the first chamber and vertically penetrating through the second partition wall;
a rotor being housed in the internal space at a lower position than the second partition wall,
the rotor rotating around a vertically-extending rotation axis; and
a center-side space disposed in a center part of the rotor,
the center-side space being communicated with the supply hole through an upper part of the center-side space which is open,
wherein
the processing-target gas is introduced from the inlet hole to the introduction path,
the processing-target gas flows into the center-side space through the supply hole,
the rotor rotates to separate the mist oil from the processing-target gas which is flowing from the center-side space to an outer periphery of the rotor,
the separated oil is emitted from the outer periphery of the rotor,
the processing-target gas which has discharged from the outer periphery of the rotor flows into the first chamber through the communication hole.
2. The oil separator according to claim 1, wherein the communication hole is arranged radially inward with respect to the outer periphery of the rotor.
3. The oil separator according to claim 1, wherein the oil separator further comprises a fitted portion disposed projecting downward from a lower surface of the second partition wall and inserted into an upper opening of the center-side space, and
the supply hole extends from an upper surface of the second partition wall to a lower end portion of the fitted portion.
4. The oil separator according to claim 1, wherein the oil separator further comprises:
a lower partition wall member disposed in a lower end of the case and being adjacent to a separation chamber located below the second partition wall;
a lower case covering the lower partition wall member from below and constituting an injection chamber below the lower partition wall member;
a through hole formed on the lower partition wall member to vertically penetrate through the lower partition wall member;
a spindle being passed through the through hole and rotating with the rotor as a single integrated unit; and
a nozzle disposed projecting from an outer peripheral surface of the spindle in the injection chamber,
the nozzle injecting oil in a circumferential direction, the nozzle rotating the spindle and the rotor,
the rotor includes:
a plurality of separation disks being stacked and vertically spaced in the separation chamber; and
a lower holder holding the plurality of separation disks from below,
the center-side space vertically penetrate through the plurality of separation disks and the lower holder,
the spindle is inserted into the center-side space,
the outer peripheral surface of the spindle is bonded to an inner peripheral edge of the lower holder, and
the spindle closes an lower opening of the center-side space.

5. The oil separator according to claim 4, wherein
the oil separator further comprises a labyrinth seal disposed around the through hole and between the lower partition wall member and the lower holder.

6. The oil separator according to claim 4, wherein
the oil separator further comprises:
a communication tube portion disposed of the lower case, the communication tube portion being communicated from the injection chamber with a crankcase of an engine; and
a pressure control hole penetrating through the lower holder and communicated with the center-side space, and
the processing-target gas in the crankcase flows into the center-side space through the communication tube portion through the injection chamber through the pressure control hole.

7. The oil separator according to claim 4, wherein
the oil separator further comprises:
a drain hole vertically penetrating through the lower partition wall member;
a standing wall disposed upright on a top surface of the lower partition wall member at an inner edge of the drain hole; and
a ceiling disposed above the drain hole and extending radially outward at an upper portion of the standing wall,
the ceiling is inclined downward from one circumferential end of the drain hole to another circumferential end, and
a lowest portion of the ceiling is coupled to the other circumferential end of the drain hole.

8. The oil separator according to claim 7, wherein
an outer radial end portion of the ceiling abuts on an inner peripheral surface of the case.

9. The oil separator according to claim 4, wherein
the oil separator further comprises:
a drain hole vertically penetrating through the lower partition wall member;
a tubular partition wall projecting upward on an outer peripheral edge of the lower holder; and
a flange extending radially outward from the partition wall,
the flange is located away from an inner peripheral surface of the case,
a clearance is formed between the flange and the inner peripheral surface of the case,
an oil process chamber is formed between the flange and the lower partition wall member,
the oil process chamber and the separation chamber are communicated through the clearance between the flange and the inner peripheral surface of the case,
the drain hole penetrates inside the oil process chamber through the lower partition wall member.

10. The oil separator according to claim 7, wherein
the oil separator further comprises a tubular oil guard disposed extending downward from a lower surface of the lower partition wall member,
the nozzle is disposed inside the oil guard, and
the drain hole is disposed outside the oil guard.

11. The oil separator according to claim 1, wherein
the oil separator further comprises:
an upper partition wall member disposed in an upper end of the case and being adjacent to a second chamber located above the first partition wall;
a second communication hole vertically penetrating through the first partition wall from the first chamber to the second chamber;
an upper case covering the upper partition wall member from above and constituting a third chamber above the upper partition wall member;
a valve hole vertically penetrating through the upper partition wall member from the second chamber to the third chamber;
a valve opening/closing the valve hole and disposed in the second chamber, the valve adjusting a level of an opening of the valve hole,
a gas discharge portion disposed in the upper case,
the gas discharge portion discharging the processing-target gas from the third chamber.

* * * * *